US012651173B2

(12) United States Patent
Derzsy et al.

(10) Patent No.: US 12,651,173 B2
(45) Date of Patent: Jun. 9, 2026

(54) KNOWLEDGE DISCOVERY BASED ON INDIRECT INFERENCE OF ASSOCIATION

(71) Applicant: AT&T Intellectual Property I, L.P., Atlanta, GA (US)

(72) Inventors: Noemi Derzsy, New York, NY (US); Subhabrata Majumdar, Jersey City, NJ (US); Rajat Malik, Metuchen, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1141 days.

(21) Appl. No.: 17/373,385

(22) Filed: Jul. 12, 2021

(65) Prior Publication Data

US 2023/0022673 A1    Jan. 26, 2023

(51) Int. Cl.
| | |
|---|---|
| *G06N 5/022* | (2023.01) |
| *G06F 40/295* | (2020.01) |

(Continued)

(52) U.S. Cl.
CPC .......... *G06N 5/022* (2013.01); *G06F 40/295* (2020.01); *G06F 40/40* (2020.01); *G06N 5/04* (2013.01)

(58) Field of Classification Search
CPC ........... G06N 5/022; G06N 5/04; G06N 5/01; G06N 7/01; G06N 20/00; G06F 40/295; G06F 40/40; G06F 40/30
See application file for complete search history.

(56) References Cited

U.S. PATENT DOCUMENTS

| | | | |
|---|---|---|---|
| 7,912,701 B1* | 3/2011 | Gray | G06F 40/30 |
| | | | 704/7 |
| 9,189,473 B2 | 11/2015 | Galle et al. | |

(Continued)

OTHER PUBLICATIONS

Silva, Filipi Nascimento et al. "Using network science and text analytics to produce surveys in a scientific topic." J. Informetrics 10 (2016): 487-502. (Year: 2016).*

(Continued)

*Primary Examiner* — Miranda M Huang
*Assistant Examiner* — Victor Adelard Nault
(74) *Attorney, Agent, or Firm* — Guntin & Gust, PLC; Miyoung Shin

(57) ABSTRACT

Techniques for knowledge discovery based on indirect inference of association are presented. A data management component (DMC) can determine and extract, in a structured format, entities, relationships between entities, and concepts relating thereto in documents, based on analysis of information in the documents and/or keywords relating to concepts, to generate an association inference model. Using artificial intelligence techniques, DMC can embed the entities and relationships to a common representation to generate and train a scoring model that can be used to evaluate and score similarity strength between entities, including entities that do not have a known relationship, and can predict or infer relationships, including indirect relationships, between entities or between concepts. In that regard, DMC or user can evaluate concept-level scores to determine a level of relationship between concepts. DMC can feedback information from the scoring model or evaluation to update the association inference model.

20 Claims, 12 Drawing Sheets

(51) Int. Cl.
   *G06F 40/40* (2020.01)
   *G06N 5/04* (2023.01)

(56) References Cited

U.S. PATENT DOCUMENTS

| | | | | |
|---|---|---|---|---|
| 10,394,804 | B1 | 8/2019 | Podgorny et al. | |
| 10,521,655 | B1 * | 12/2019 | Carbune | G06V 30/153 |
| 10,579,714 | B1 | 3/2020 | Dhruv et al. | |
| 10,607,042 | B1 | 3/2020 | Dasgupta et al. | |
| 11,393,141 | B1 | 7/2022 | Hsu et al. | |
| 2013/0173257 | A1 * | 7/2013 | Rose | G06F 40/284 |
| | | | | 704/9 |
| 2014/0280084 | A1 | 9/2014 | Dulitz | |
| 2018/0011916 | A1 | 1/2018 | Mueller et al. | |
| 2019/0163728 | A1 | 5/2019 | Koren et al. | |
| 2019/0180386 | A1 | 6/2019 | Gandhi et al. | |
| 2020/0050443 | A1 * | 2/2020 | Edelsten | G06N 3/09 |
| 2020/0364270 | A1 * | 11/2020 | Harpale | G06F 40/20 |
| 2021/0103840 | A1 | 4/2021 | Kwong et al. | |
| 2022/0164683 | A1 | 5/2022 | Hao et al. | |

OTHER PUBLICATIONS

McKeown, Kathleen et al. "Predicting the impact of scientific concepts using full-text features." Journal of the Association for Information Science and Technology 67 (2016): n. pag. (Year: 2016).*

Browet, Arnaud. "Algorithms for community and role detection in networks." (2014). (Year: 2014).*

Dessí, Danilo et al. "Generating Knowledge Graphs by Employing Natural Language Processing and Machine Learning Techniques within the Scholarly Domain." ArXiv abs/2011.01103 (2020): n. pag. (Year: 2020).*

Lamurias, Andre et al. "PPR-SSM: personalized PageRank and semantic similarity measures for entity linking." BMC Bioinformatics 20 (2019): n. pag. (Year: 2019).*

Fu, Zuohui, et al. "Fairness-aware explainable recommendation over knowledge graphs." Proceedings of the 43rd international ACM SIGIR conference on research and development in information retrieval. 2020. (Year: 2020).*

Millard, Louise AC, Peter A. Flach, and Julian PT Higgins. "Machine learning to assist risk-of-bias assessments in systematic reviews." International journal of epidemiology 45.1 (2016): 266-277. (Year: 2015).*

Kerrache, Said, Ruwayda Alharbi, and Hafida Benhidour. "A scalable similarity-popularity link prediction method." Scientific reports 10.1 (2020): 6394. (Year: 2020).*

Papegnies, Etienne, et al. "Conversational networks for automatic online moderation." IEEE Transactions on Computational Social Systems 6.1 (2019): 38-55. (Year: 2019).*

Chepurko et al., "ARDA: Automatic Relational Data Augmentation for Machine Learning," arXiv:2003.09758v1 [cs.LG] Mar. 21, 2020, 15 pages.

Ota et al., "Data-Driven Domain Discovery for Structured Datasets," Proceedings of the VLDB Endowment, vol. 13, No. 7, 13 pages.

"Grammarly," https://www.grammarly.com/, accessed May 3, 2021, 6 pages.

"Microsoft Editor," https://www.microsoft.com/en-us/microsoft-365/microsoft-editor, accessed May 3, 2021, 8 pages.

"Microsoft SwiftKey," https://www.microsoft.com/en-us/swiftkey?activetab=pivot_1:primaryr2, accessed May 3, 2021, 5 pages.

Derzsy et al., "An Interpretable Graph-based Mapping of Trustworthy Machine Learning Research," arXiv:2105.06591v1 [cs.SI] May 13, 2021, 12 pages.

Varshney, "Introducing AI Fairness 360," https://www.ibm.com/blogs/research/2018/09/ai-fairness-360/, Sep. 19, 2018, 4 pages.

Blondel et al., "Fast unfolding of communities in large networks", J.Stat Mech Theory and Experiment, arXiv:0803.0476v2, 2008, 12 pages.

Buscaldi et al., "Mining Scholarly Data for Fine-Grained Knowledge Graph Construction", In: Ceur Workshop Proceedings. vol. 2377, 2019, 10 pages.

Cheng et al., "Socially Responsible AI Algorithms: Issues, Purposes, and Challenges", Journal of Articial Intelligence Research, arXiv:2101.02032, vol. 71, pp. 1137-1181, Aug. 2021.

Chinazzi et al., "Mapping the physics research space: a machine learning approach", EPJ Data Sci vol. 8 No. 33, URL: https://doi.org/10.1140/epjds/s13688-019-0210-z, 2019, 18 pages.

Chouldechova et al., "A Snapshot of the Frontiers of Fairness in Machine Learning", Communications of the ACM, vol. 63 No. 5, May 2020, pp. 82-89.

Cimini et al., "Investigating the interplay between fundamentals of national research systems: performance, investments and international collaborations", Journal of Informetrics, Oct. 11, 2018, 15 pages.

Fortunato et al., "Science of science", Science Community DOI: 10.1126/science.aao0185, vol. 359, eaao0185, 2018, pp. 1007-1015.

Gracia et al., "A Comprehensive Survey on Safe Reinforcement Learning", Journal of Machine Learning Research Aug. 16, 2015, pp. 1437-1480.

Gong et al., "A Survey on Differentially Private Machine Learning", IEEE Computational Intelligence Magazine, vol. 15 No. 2 May 2020, pp. 49-64.

Helwegan et al., "Improving Fair Predictions Using Variational Inference In Causal Models", arXiv:2008.10880v1, Aug. 25, 2020, 18 pages.

Roth et al., "The Ethical Algorithm, The Science of Socially aware algorithm design", Oxford University Press Incorporated, 2019.

Krasanakis et al., "Applying Fairness Constraints on Graph Node Ranks under Personalization Bias", In: Complex Networks & Their Applications, 2012, pp. 610-622.

Li et al., "Co-Occurrence Network of High-Frequency Words in the Bioinformatics Literature: Structural Characteristics and Evolution", Appl. Sci. 2018, 8, 1994, 14 pages. doi:10.3390/app8101994.

Madras et al., "Fairness through Causal Awareness: Learning Causal Latent-Variable Models for Biased Data", FAT* 19, URL: https://doi.org/10.1145/3287560.3287564, Jan. 29-31, 2019, 13 pages.

Manning et al., Foundations of statistical natural lanhuage processing. MIT Press, First edn., 1999.

Mehrabi et al., "A Survey on Bias and Fairness in Machine Learning", arXiv:1908.09635, Sep. 17, 2019, 31 pages.

Mills et al., "Six Steps to Bridge the Responsible AI Gap", URL: https://www.bcg.com/publications/2020/six-steps-for-socially-responsible -artificial intelligence, Aug. 24, 2021, 14 pages.

Osting et al., "Enhanced statistical rankings via targeted data collection", Proceedings of the 30 th International Conference on Machine Learning, 2013, pp. 489-497.

Palmucci et al., "Where is your field going? A machine learning approach to study the relative motion of the domains of physics", PLoS ONE 15 (6): e0233997. URL: https://doi.org/10.1371/journal.pone.0233997, Jun. 18, 2020, 16 pages.

Pathak et al., "Large Margin Multiclass Gaussian Classification with Differential Privacy", arXiv:1005.0063v2, PSDML-2010, 14 pages.

Portenoy et al., "Leveraging Citation Networks to Visualize Scholarly Influence over time", Frontiers in Research Metrics and Analytics, vol. 2 Article 8, Nov. 27, 2017, 10 pages.

Radhakrishan et al., "Correction: Novel keyword co-occurrence network-based methods to foster systematic reviews of scientific literature", Plos one vol. 12 No. 9, pp. e0185771, 2017.

Russell et al., "Explaining Reward Functions in Markov Decision Processes", The Thirty-Second International Florida Artificial Intelligence Research Society Conference, May 19-22, 2019, pp. 56-61.

Sazonova et al., "Combining Binary Classifiers for a Multiclass Problem with Differential Privacy", Transactions On Data Privacy, 2017, pp. 51-70.

Senekane Makhamisa, "Differentially Private Image Classification Using Support Vector Machine and Differential Privacy", Mach. Learn. Knowl. Extr, doi:10.3390/make1010029, 2019, pp. 483-491.

Serna et al., "SensitiveLoss: Improving Accuracy and Fairness of Face Representations with Discrimination-Aware Deep Learning", arXiv:2004:11246, 2020, 14 pages.

(56) References Cited

OTHER PUBLICATIONS

Simao et al., "Safe Policy Improvement with Baseline Bootstrapping in Factored Environments", The Thirty-Third AAAI Conference on Artificial Intelligence (AAAI-19), 2019, 00. 4967-4974.

Steck, Harald, "Calibrated Recommendations", In: RecSys—2018, pp. 154-162.

Tacchella et al., "Novel Keyword co-occurrence network-based methods to foster systematic reviews of scientific literature" PLUS ONE vol. 12 No. 9, 2017.

Toreini et al., "The relationship between trust in AI and trustworthy machine learning technologies", FAT* '20, URL: https://doi.org/10.1145/nnnnnnn.nnnnnnn, Jan. 27-30, 2020, 12 pages.

Tullu et al., "Writing the title and abstract for a research paper: Being concise, precise, and meticulous is the key", Saudi Journal of Anesthesia vol. 13, Feb. 21, 2019, pp. s12-S17.

Xiong et al., "Towards a Robust and Trustworthy Machine Learning System Development", arXiv:2101.03042v1, 2021, 40 pages.

Yeganova et al., Navigating the landscape of COVID-19 research through literature analysis: A bird's eye view, KDD'20 Health Day: AI for COVID, Aug. 23-27, 2020, 9 pages.

Zheng et al., "The Science of Science: From the Perspective of Complex Systems", URL: https://doi.org/10.1016/j.physrep.2017.10.001, 2017, 89 pages.

Non-Final Office Action received for U.S. Appl. No. 17/306,300 dated Dec. 30, 2022, 52 pages.

\* cited by examiner

700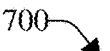
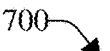
FIG. 7

FIG. 8

1000

1002

EXTRACTING INFORMATION RELATING TO A GROUP OF ENTITIES, RELATIONSHIPS BETWEEN ENTITIES, AND A GROUP OF CONCEPTS ASSOCIATED WITH A GROUP OF ELECTRONIC DOCUMENTS FROM THE GROUP OF ELECTRONIC DOCUMENTS AND ENTITY-RELATED INFORMATION IN A DESIRED STRUCTURED FORMAT, BASED ON ANALYSIS OF THE ELECTRONIC DOCUMENTS AND ENTITY-RELATED INFORMATION

1004

DETERMINING AN ASSOCIATION INFERENCE MODEL BASED ON THE INFORMATION RELATING TO THE GROUP OF ENTITIES, THE RESPECTIVE RELATIONSHIPS BETWEEN THE RESPECTIVE ENTITIES, AND THE GROUP OF CONCEPTS EXTRACTED IN THE DESIRED STRUCTURED FORMAT

1006

EMBEDDING THE ENTITIES, RELATIONSHIPS, AND/OR CONCEPTS IN A COMMON REPRESENTATION TO CREATE A SCORING MODEL, BASED ON THE RESULTS OF ANALYSIS OF ASSOCIATION INFERENCE MODEL INFORMATION OF THE ASSOCIATION INFERENCE MODEL IN THE DESIRED STRUCTURED FORMAT AND/OR OTHER INFORMATION

1008

DETERMINING CANDIDATE ENTITIES FOR SCORING BASED ON THE RESULTS OF ANALYSIS OF THE CONCEPTS ASSOCIATED WITH THE SCORING MODEL AND/OR EXTERNAL INFORMATION

1010

DETERMINING RESPECTIVE ENTITY-LEVEL RELATEDNESS SCORES ASSOCIATED WITH RESPECTIVE PAIRS OF CANDIDATE ENTITIES BASED ON THE RESULTS OF THE ANALYSIS OF THE SCORING MODEL AND/OR THE EXTERNAL INFORMATION

1012

DETERMINING RESPECTIVE CONCEPT-LEVEL RELATEDNESS SCORES ASSOCIATED WITH RESPECTIVE PAIRS OF CONCEPTS BASED ON THE RESPECTIVE ENTITY-LEVEL RELATEDNESS SCORES ASSOCIATED WITH THE RESPECTIVE PAIRS OF CANDIDATE ENTITIES ASSOCIATED WITH THE RESPECTIVE CONCEPTS

1014

PRESENTING THE RESPECTIVE CONCEPT-LEVEL RELATEDNESS SCORES AND/ OR THE RESPECTIVE ENTITY-LEVEL CONCEPT SCORES FOR EVALUATION

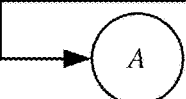

KNOWLEDGE DISCOVERY BASED ON INDIRECT INFERENCE OF ASSOCIATION

TECHNICAL FIELD

The subject disclosure relates generally to electronic information processing, e.g., to knowledge discovery based on indirect inference of association.

BACKGROUND

Practitioners in different fields can spend an undesirable and considerable amount of time in vetting and discovering new domains of interest. This can include discovering new application areas of a method and/or deciding what methods may be useful for applying to a specific problem. Typically, this can involve a user(s) (e.g., a practitioner(s), such as a project manager(s), an engineer(s), a data scientist(s), or another user) manually reading literature and/or consulting with domain experts, and, in addition to being relatively difficult generally, this can be especially difficult for new areas of interest where usually there can be scarce literature and expert guidance available.

The above-described description is merely intended to provide a contextual overview relating to electronic information processing and is not intended to be exhaustive.

BRIEF DESCRIPTION OF THE DRAWINGS

FIG. 7 presents a diagram of an example graph that can visualize an overall co-occurrence network, including communities of words, focusing on two trustworthy machine learning (TwML)-specific communities of a group of communities, in accordance with various aspects and embodiments of the disclosed subject matter.

FIG. 8 presents a diagram of example graphs of word-level relevance scores for selected papers, in accordance with various aspects and embodiments of the disclosed subject matter.

FIG. 10 illustrates a flow diagram of an example, non-limiting method that can desirably infer or determine a relationship (e.g., an indirect or second order relationship) between two concepts, in accordance with various aspects and embodiments of the disclosed subject matter.

DETAILED DESCRIPTION

Figure 1:
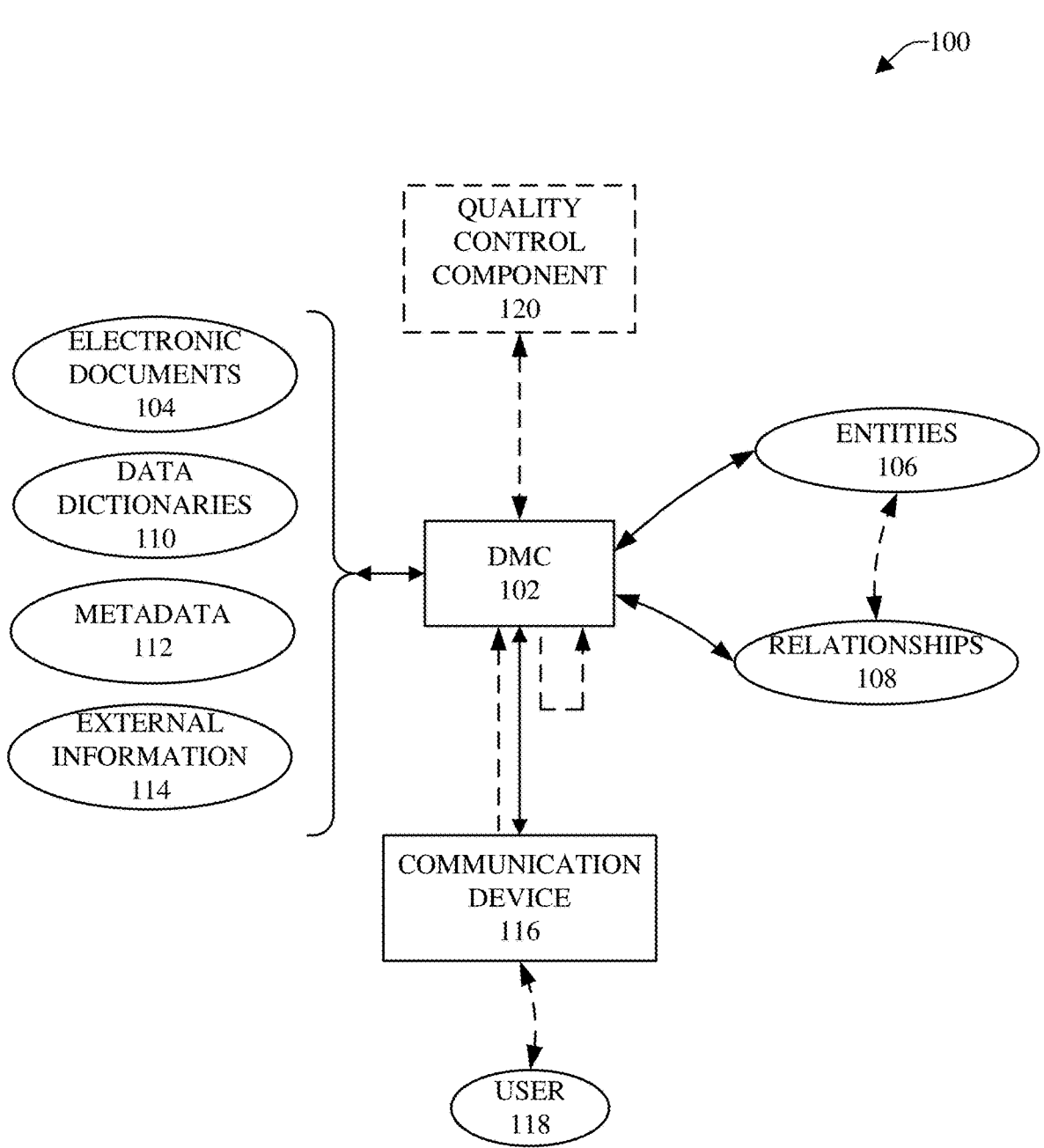
FIG. 1 depicts a block diagram of an example, non-limiting system that can desirably infer or determine relationships, including indirect or previously unknown relationships, between concepts, documents, and/or terms and other concepts, documents, and/or terms, in accordance with various aspects and embodiments of the disclosed subject matter.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Practitioners in different fields can spend an undesirable and considerable amount of time in vetting and discovering new domains of interest. This can include discovering new application areas of a method and/or deciding what methods may be useful for applying to a specific problem. Typically, this can involve a user(s) (e.g., a practitioner(s), such as a project manager(s), an engineer(s), a data scientist(s), or another user) manually reading literature and/or consulting with domain experts, and, in addition to being relatively difficult generally, this can be especially difficult for new areas of interest where usually there can be scarce literature and expert guidance available. Also, for a larger organization (e.g., company, corporation, or other organization), creating an overall picture of information (e.g., internal information or other information) associated with the organization can be undesirably difficult, inefficient, time intensive, costly, and/or impractical to do manually.

An existing and inefficient approach can be to have the judgment of inferring connection between two topics or concepts mainly can be done as a subjective decision by a user. A relatively limited automated tool can analyze available literature and use rules to determine a direct relatedness between topics or concepts. However, such an automated tool can be significantly lacking in robustness and accuracy with regard to identifying relatedness between topics or concepts.

The disclosed subject matter can overcome these problems and other problems associated with processing information, determining relationships between disparate entities and between disparate concepts, and determining and controlling bias, fairness, transparency, and privacy with respect to concepts. To that end, the disclosed subject matter presents techniques, methods, and systems that can desirably perform knowledge discovery based on indirect inference of association. The disclosed subject matter can comprise a data management component (DMC) that can determine and extract, in a structured format, information relating to respective entities (e.g., nodes), respective relationships (e.g., edges) between entities, and respective concepts relating thereto in a group of documents (e.g., electronic documents), based at least in part on analysis of information in or associated with the group of documents and/or and entity-related information relating to the group of entities (e.g., data dictionaries, metadata, grouping of terms into concepts, respective keywords relating to respective concepts, domain-specific information, respective concept descriptions of the respective concepts, and/or other external information), to generate an association inference model that can comprise the respective entities, the respective relationships, and/or the respective concepts.

The DMC can embed the respective entities, the respective relationships between the respective entities, and/or the respective concepts of the group of concepts in a common representation to create (e.g., generate) a scoring model that can be trained to be representative of the respective entities, the respective relationships between the respective entities, and/or the respective concepts, based at least in part on the results of an analysis of association inference model information of the association inference model in the desired structured format and/or other information (e.g., auxiliary information, such as entity weights and/or relationship weights). In some embodiments, the DMC can employ an artificial intelligence (AI) component to perform an AI analysis and/or graph mining on the association inference model information of the association inference model, and can create the scoring model (e.g., a trained AI-based scoring model) based at least in part on the results of the AI analysis and/or graph mining, as more fully described herein.

For instance, using the AI techniques, the DMC can embed the entities, relationships between entities, and/or other information of the association inference model to a common representation to generate and train a scoring model that can be used to evaluate and score relatedness (e.g., similarity) strengths between entities, including entities that do not have a known relationship, and can predict or infer relationships (e.g., connections), including indirect (e.g., indirect, secondary, or tertiary) relationships, between the entities or between the concepts. In that regard, the DMC can determine candidate entities of the group of entities for scoring based at least in part on results of an analysis of information relating to the concepts associated with the scoring model and/or external information. The information relating to the concepts can comprise, for example, respective initial sets of keywords associated with the respective concepts, the respective entities associated with the respective concepts, and/or the respective relationships between the respective entities. The external information can comprise, for example, respective expanded sets of keywords associated with the respective concepts. The DMC can determine (e.g., calculate) or infer, for example, using AI models, the respective entity-level relatedness (e.g., similarity or connectedness) scores associated with the respective pairs of candidate entities based at least in part on the results of the analysis of the scoring model and/or the external information. A relatedness score between a pair of candidate entities can relate to or can be a measure of a level of relatedness, connectedness, or similarity between the candidate entities of the pair.

The DMC can aggregate respective entity-level relatedness scores associated with respective candidate entities that are associated with the respective concepts, and can determine (e.g., calculate) or infer, for example, using AI models, respective concept-level relatedness scores associated with respective pairs of concepts based at least in part on (e.g., as a function of) the respective entity-level relatedness scores associated with the respective candidate entities, as more fully described herein. The DMC can present the respective concept-level relatedness scores and/or the respective entity-level concept scores for evaluation by the DMC and/or one or more users (e.g., via a communication device(s) or an interface(s) associated with the one or more users).

The DMC or the user(s) can evaluate the respective concept-level relatedness scores and/or other desired information (e.g., the respective entity-level concept scores or other information) associated with respective pairs of concepts. For instance, with regard to each concept-level relatedness score associated with a pair of concepts of the group of concepts, the DMC or the user(s) can determine whether the concept-level relatedness score associated with the pair of concepts satisfies (e.g., meets or exceeds; is at or greater than) a defined threshold relatedness score based at least in part on the results of the evaluation of the concept-level relatedness score associated with the pair of concepts and the defined threshold relatedness score. If the DMC or the user(s) determines that the concept-level relatedness score associated with the pair of concepts satisfies the defined threshold relatedness score, the DMC or the user(s) can infer or determine that there is a relationship between the concepts of the pair of concepts. In some embodiments, the relationship between such concepts can be an indirect, second order, tertiary, or other higher order (e.g., other less direct) relationship between such concepts, wherein such indirect or higher order relationship can exist even where respective underlying entities associated with the respective concepts of the pair of concepts do not have a relationship with each other (e.g., do not share an edge with each other).

For each relationship between concepts inferred or determined by the DMC or the user, the DMC can store the information relating to the relationship between the concepts in the data store. Such information relating to the relationship between the concepts can comprise, for example, information indicating or specifying the relationship between the concepts of the pair, the concept-level relatedness score associated with the pair of concepts, information relating to the concepts of the pair (e.g., concept description information, information relating to the respective organizations or departments associated with the respective entities, information indicating what type(s) of relatedless between the concepts of the pair led to the relatively higher concept-level relatedness score, and/or other desired information relating to the relationship). In some embodiments, with regard to each relationship between concepts determined by the DMC or the user, the DMC can provide feedback information (e.g., received from a user(s) or generated by the DMC) relating to the one or more respective relationships inferred or determined between respective concepts of respective concept pairs to facilitate enhancing (e.g., improving or optimizing) future inferences or determinations of relationships between concepts or relationships between entities respectively associated therewith. For instance, the DMC can (e.g., optionally can) update (e.g., modify) the association inference model, based at least in part on the information relating to the relationship between the concepts of the concept pair, which can enhance (e.g., improve or optimize) future inferences or determinations regarding whether there is a relationship (e.g., a first-level or direct relationship, or a second-level or indirect relationship) between concepts of a concept pair. As part of version control, the DMC can maintain (e.g., continue to store) information relating to one or previous versions of the association inference model in the data store, in addition to storing the updated current version of the association inference model in the data store.

The DMC, another system associated with the DMC, and/or a user can utilize the information regarding the respective relationships between respective concepts, and/or the respective relationships between respective entities, for any of several desirable uses. For instance, the DMC, the other system, and/or the user can utilize such information regarding the respective relationships between respective concepts and/or the respective relationships between respective entities to desirably evaluate bias, fairness, transparency, and/or privacy with regard to desired projects, to enhance (e.g., improve or optimize) content moderation, to enhance operational efficiency (e.g., enhance budget allocation, cross-team collaboration, or career intelligence), and/or for other desired uses, as more fully described herein.

These and other aspects and embodiments of the disclosed subject matter will now be described with respect to the drawings.

FIG. 1 depicts a block diagram of an example, non-limiting system 100 that can desirably (e.g., accurately and efficiently) infer or determine relationships, including indirect or previously unknown relationships, between concepts, documents, and/or terms and other concepts, documents, and/or terms, in accordance with various aspects and embodiments of the disclosed subject matter. The system 100 can comprise a data management component (DMC) 102 that can analyze existing documents 104 (e.g., electronic documents), and other information relating or relevant thereto, and based at least in part on such analysis, can desirably identify or determine entities 106, and can determine relationships 108, including indirect relationships, between entities (e.g., concepts, documents, terms, or phrases) and other entities (e.g., other concepts, documents, terms, or phrases) associated with documents (e.g., electronic documents 104), including historical, current, and subsequently received documents, which can include databases, tables, charts, web pages, scanned documents, and/or other desired information, in a structured or non-structured format, such as more fully described herein. In accordance with various embodiments, the DMC 102 can employ various techniques, including AI techniques (e.g., AI, machine learning, neural network, and/or data mining techniques), to infer, predict, discover, identify, or determine respective relationships 108 between respective entities 106, irrespective of whether the entities 106 share an edge with each other, including respective relationships 108 (e.g., direct or indirect relationships) between respective concepts (e.g., disparate concepts, topics, or areas of interest). The DMC 102 can use internal and external data (e.g., documents, keywords, metadata, data dictionaries, domain-specific information, concept descriptions, and/or other data) as input to models (e.g., association inference model, scoring model) to generate, update, or train the models, such as described herein.

The DMC 102 can employ the models (e.g., association inference model, scoring model) to infer or determine relationships 108, including indirect relationships, between entities 106 and other entities 106, including, for example, relationships between concepts. The DMC 102, employing the models, can infer or determine such relationships 108 through community and/or association-based analysis of textual data or other data in or associated with documents 104. In some embodiments, the DMC 102, employing the scoring model, can determine and provide scores (e.g., relatedness, association, or similarity scores) that can quantify the strength of potential associations (e.g., relations) between entities (e.g., concepts, documents, terms, or phrases and other concepts, documents, terms, or phrases).

The disclosed subject matter can provide desirable data enhancement and a variety of improvements over conventional techniques for processing, discovering, and managing data. For instance, the system 100, employing the DMC 102 and associated models, can extract more information (e.g., more useful, beneficial, and/or otherwise desirable information) from data a user (e.g., person, organization, company, enterprise, or other user) already has (e.g., already has in storage of or associated with the user) and/or data that can be available to the user from other data sources (e.g., the Internet, World Wide Web, electronic or online libraries or databases, and/or other data source). The system 100, employing the DMC 102 and associated models, can enhance existing data to make it usable or more suitable in or for existing or future products or services of or associated with the user. The system 100, employing the DMC 102 and associated models, and the enhanced data obtained therefrom, can desirably inform strategic decisions and roadmaps for future projects of or associated with the user and/or can enable the user to gain more insights using richer connections between application areas, as such richer connections are inferred or determined by the DMC 102 and associated models. The system 100, employing the DMC 102 and associated models, also can desirably structure and enhance existing internal information of or associated with the user in an objective manner, rather than relying on the subject individual judgment or domain knowledge of users.

The system 100 also can provide desirable cost savings to the user. For instance, the system 100 can provide cost savings by reducing dependency on ad-hoc approaches (e.g., strategy meetings or emails at multiple levels of an organization, use of external consultants, or other ad-hoc approaches) by utilizing the vast amount of internal information of the user to create a machine learning-based approach (e.g., as implemented and performed by the DMC 102). Ad-hoc approaches typically can be inefficient and do not scale well for larger enterprises, particularly a larger enterprise that provides diverse products and services, and thus can place an undesirably larger cost on individual and project times, which, of course, can result in undesirably higher financial costs to the enterprise.

The system 100 can have several desirable uses. For instance, the system 100, by employing the DMC 102 and associated techniques and models, can identify biases in data (e.g., electronic documents, data relating to concepts, and/or other data) and provide a scoring (e.g., fairness and/or bias-related scoring) of internal projects that can quantify their fairness and/or bias risk. The enhanced data and enhanced information relating to relationships (e.g., inferred relationships, including indirect relationships, between concepts and documents, terms, and/or other concepts), as provided by the DMC 102, can guide AI governance strategy around responsible AI practices, such as bias, fairness, transparency, and/or privacy regarding data (e.g., data associated with users, such as consumers, employees, or other types of users). The system 100 also can serve as a quantitative approach, in addition to subjective considerations, such as executive strategy, regulatory or legal guidance, and/or human resources guidelines. The system 100 also can facilitate (e.g., enable or assist in) determining relevance of internal projects of a user (e.g., enterprise, company, or organization) to responsible AI vetting based on concepts with which such projects are associated.

Another desirable use the system 100 can provide is with respect to content moderation. For instance, the DMC 102 can scan articles, news, or other information with regard to accepted moderation practices, such as identifying fake news, prejudice, profanity, and/or other undesirable content moderation issues in the articles, news, or other information based on not only direct occurrence of signal words, which can indicate fake news, prejudice, profanity, and/or another undesirable content moderation issue but also based on inferred concepts with which an article, news, or other information is associated. The system 100 (e.g., the DMC 102 and associated models) can be trained using existing data on articles, news, or other information and the concepts with which they are associated, as more fully described herein.

Still another desirable use the system 100 can provide is about operational efficiency. The system 100 can provide operational efficiency with regard to, for example, budget allocation, cross-team collaboration, career intelligence, and/or other desired operational aspects associated with a user (e.g., enterprise, company, or organization). For instance, with regard to budget allocation, the system 100, by employing the DMC 102, can utilize information, including historical information, regarding projects or initiatives, and budgets allotted to them over the years, to more efficiently allocate budgets for future projects or initiatives, or spend excess budget on another project or initiative that otherwise may have been overlooked due to lack of information. The system 100, by employing the DMC 102, also can be used to desirably prioritize future projects in new growth areas or domains that are attracting more attention internally (e.g., within the enterprise, company, or organization) or externally.

With regard to cross-team collaboration, the system 100, employing the DMC 102, can be trained on internal connectivity information, such as, for example, organizational charts, project information, information relating to team members (e.g., respective team members associated with respective projects), information relating to meeting participants, and/or other information to identify collaboration and knowledge sharing opportunities between teams or participants in distant or disparate parts of the enterprise, company, or organization who are working in related (e.g., directly or indirectly related) or similar areas. Regarding career intelligence, based on internal activity data or collaborations (e.g., collaborations between teams, or collaborations between employees of different or same teams), the system 100, employing the DMC 102, can quantitatively evaluate employees, recommend growth areas or incentives, and/or optimize productivity of the employees. The system 100, including the DMC 102 and associated techniques and models, also can be utilized for a variety of other desired purposes, including, but not limited to, other purposes such as described herein.

Figure 2:
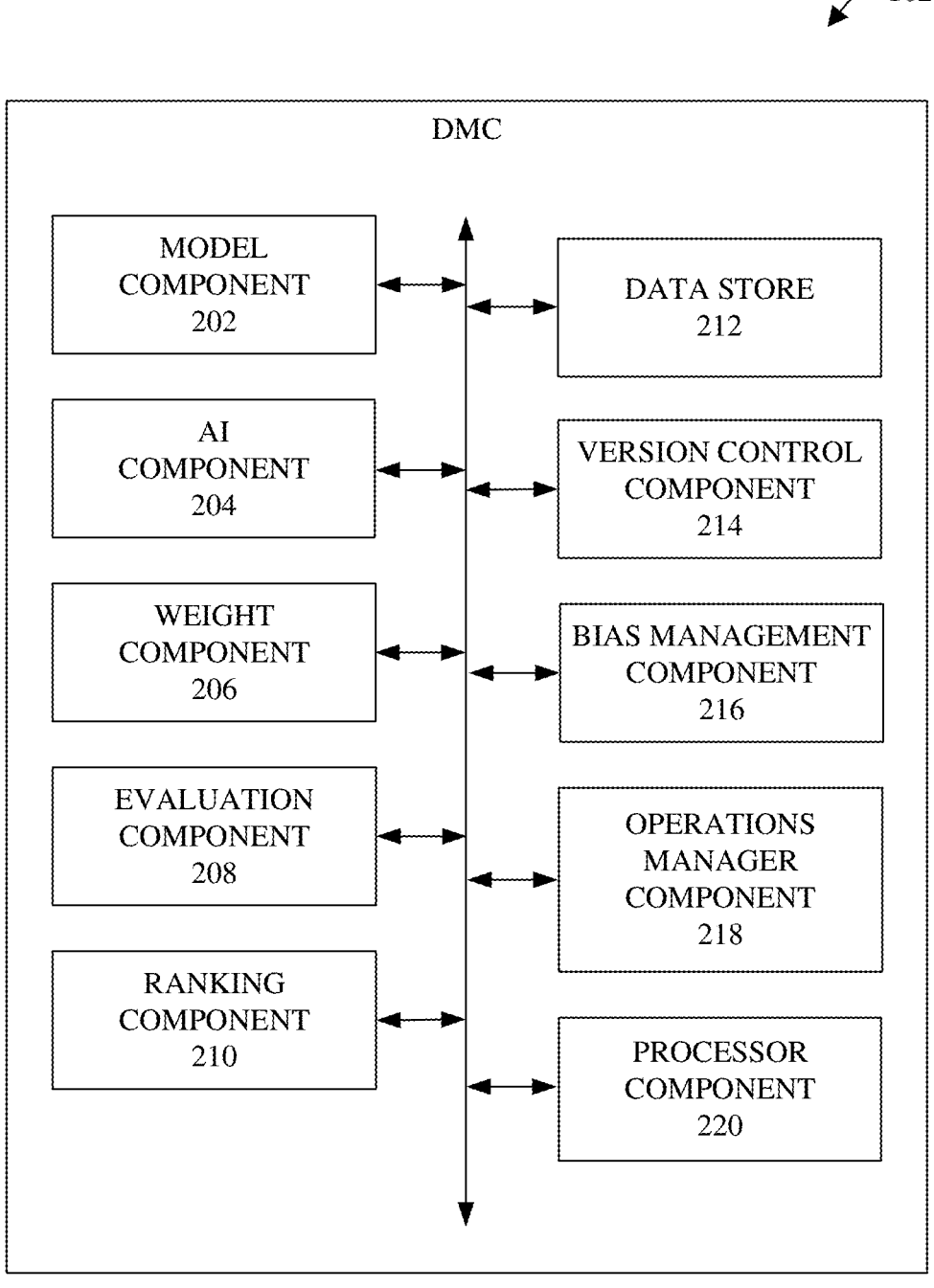
FIG. 2 depicts a block diagram of an example, non-limiting data management component (DMC), in accordance with various aspects and embodiments of the disclosed subject matter.
Figure 3:
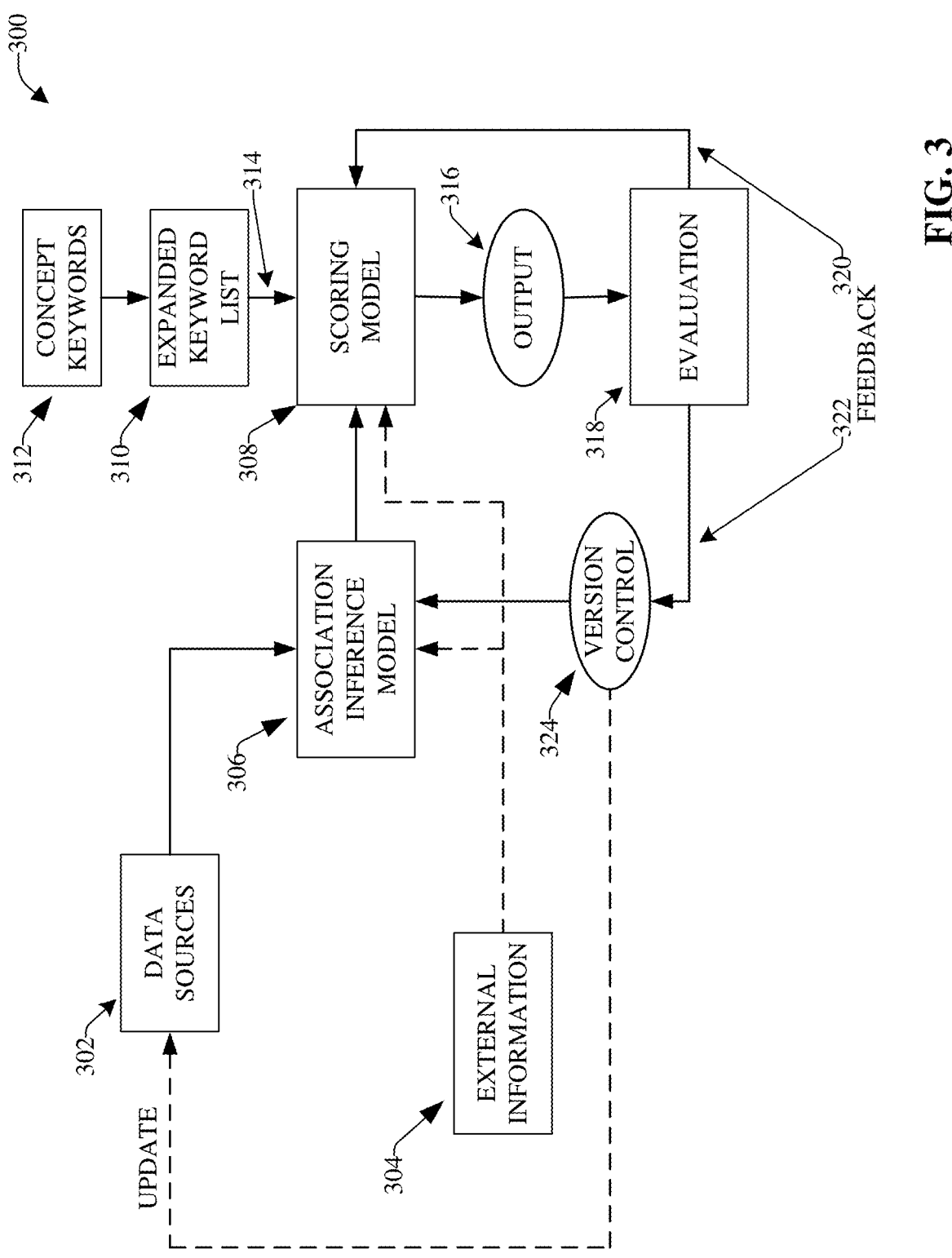
FIG. 3 illustrates a block diagram of an example non-limiting data management process that can be employed and performed by the DMC to desirably infer or determine relationships, including indirect or previously unknown relationships, between concepts, documents, and/or terms and other concepts, documents, and/or terms, in accordance with various aspects and embodiments of the disclosed subject matter.

Referring to FIGS. 2 and 3 (along with FIG. 1), FIG. 2 depicts a block diagram of an example, non-limiting DMC 102, and FIG. 3 illustrates a block diagram of an example non-limiting data management process 300 that can be employed and performed by the DMC 102 to desirably infer or determine relationships, including indirect or previously unknown relationships, between concepts, documents, and/or terms and other concepts, documents, and/or terms, in accordance with various aspects and embodiments of the disclosed subject matter. The DMC 102 can receive (e.g., obtain) information relating to data elements from a variety of data sources (as indicated at reference 302 of the example data management process 300). For instance, the DMC 102 can receive information of existing electronic documents 104 (e.g., current and historical electronic documents). The electronic documents 104 can comprise information relating to various existing concepts, terms, and known relationships between concepts, documents, terms, or phrases to other concepts, documents, terms, or phrases. The information relating to the various existing concepts, terms, and their known relationships can be in a raw data form (e.g., items of data contained in a document 104, a table, or a database) or can be at a desired aggregate level (e.g., a summary of information of a document 104, a list of documents 104). The electronic documents 104 can be or can comprise, for example, papers or manuscripts, databases or wikis (e.g., internal wiki), tables, circulars, organizational charts, news, articles, or other desired types of documents. Respective electronic documents 104 can be in structured form (e.g., a structured database, table, or mapping) or unstructured form (e.g., freeform textual information). The electronic documents 104 can relate to various concepts (e.g., topics) or information, such as, for example, communications information (e.g., cellular communications, broadband communications, online communications, Internet protocol (IP)-based or packetized communications, or other type of communications), services information, products information, financial information, customer information, transaction information, geographical information, weather or climate information, food or nutritional information, medical information, entertainment information, sports information, demographic information (e.g., information relating to demographics of people, such as customers), and/or other desired types of concepts or information.

The DMC 102 also can receive data dictionaries 110 and metadata 112 relating to the electronic documents 104 (e.g., some of the electronic documents 104) or other data sources. The data dictionaries 110 and/or metadata 112 can comprise or provide definitional information, contextual information, or other information that can define or provide context for the information in or associated with the electronic documents 104. For example, with regard to a data element in a table or database, a particular data dictionary can indicate that, in a particular table or database, a column name "carbs" is an abbreviation of the word "carbohydrates." As another example, another data dictionary can indicate that "RAN" can mean "radio access network" and "mW" can mean "millimeter wave" in the context of wireless or cellular communication technology.

In some embodiments, the DMC 102 also can receive external information 114 (e.g., additional or external information) from one or more external data sources (as indicated at reference numeral 304 of the data management process 300), wherein the external information 114 can provide definitions or contextual information relating to entities 106 (e.g., nodes) to facilitate inferring or identifying relationships (e.g., indirect relationships) between entities (e.g., relationships between concepts, documents, or terms and other concepts, documents, or terms). The external information 114 can comprise or relate to, for example, respective groupings of terms into respective concepts, an initial set of keywords associated with a concept, dictionaries by third-party curators of specific types of datasets, domain-specific information (e.g., information specific to the cellular communications domain, information specific to the financial sector domain, information specific to the medical domain, or other domain-specific information), articles, and/or descriptions of electronic documents 104, concepts, tables, or databases (or associated columns or rows of tables or databases) as freeform textual information.

In some embodiments, an initial set of keywords associated with a concept can be expanded into an expanded set of keywords associated with the concept, wherein the initial set of keywords can be expanded into or to include representative terms relating to the concept, such as more fully described herein. As a non-limiting example, an initial set (e.g., list or group) of keywords can comprise certain words relating to the concept of advertising. The disclosed subject matter (e.g., the DMC 102 or a user) can expand the initial set of keywords to form an expanded set of keywords that can include other words or phrases that can frequently occur in the set (e.g., group or corpus) of electronic documents 104 being analyzed by the DMC 102 (e.g., other words or phrases that can frequently occur in electronic documents 104 determined to be related to the concept of advertising, where such other words or phrases were not included in the initial set of keywords relating to the concept of advertising).

The DMC 102 can comprise a model component 202 that can create (e.g., generate) and/or train various types of models, including an association inference model and a scoring model (e.g., a relatedness, association, or similarity scoring model), that can be utilized to facilitate identifying entities 106 (e.g., nodes) and relationships 108 (e.g., edges) between entities 106. The DMC 102, employing the model component 202, can analyze the information of the electronic documents 104, the data dictionaries 110, the metadata 112, and/or the external information 114. The data sources (e.g., electronic documents 104, data dictionaries 110, metadata 112, and/or external information 114) can comprise structured or unstructured information. In some embodiments, the model component 202 can determine or create the association inference model, wherein the association inference model can receive the information from the data sources, analyze the information, and extract a group of entities 106 and respective relationships 108 between respective entities 106, and information relating to the respective entities 106 and respective relationships 108, from the documents 104, data dictionaries 110, metadata 112, and/or external information 114, in the desired structured format, based at least in part on the results of the analysis of such information (as indicated at reference numeral 306 of the data management process 300), as more fully described herein. The association inference model can comprise information regarding or relating to, for example, entities 106 (e.g., nodes), relationships 108 (e.g., edges) between entities, concepts, and/or auxiliary information, such as more fully described herein. The structured format can be one that can be suitable for (e.g., compatible with) inputting the structured information into the scoring model and/or AI component 204 to facilitate (e.g., enable) desirable analysis of the structured information by the scoring model and/or AI component 204 and/or training of the scoring model and/or AI component 204.

As disclosed, entities can be or can comprise words, terms, or phrases identified in or extracted from electronic documents 104 or other information analyzed by the DMC 102. In some embodiments, entities 106 can include data elements of tables or databases of certain electronic documents 104, wherein the data elements can be or can comprise, for example, a table, a database, a column of a table or database, a row of a table or database, an item of data (e.g., a data value of data), metadata of or associated with a document or dataset (e.g., table or database), or other type of entity.

In certain embodiments, the DMC 102 can pre-process the entities, for example, to stem or lemmatize the entities 106 based at least in part on (e.g., using or applying) desired stemming or lemmatizing techniques. For example, the DMC 102 can stem or lemmatize an entity 106 (e.g., word or term) to break down or reduce the entity 106 to its root word (e.g., break down or reduce a plural word to a singular form of the word; or break down or reduce a phrase to individual words of the phrase) based at least in part on desired stemming or lemmatizing techniques. In some embodiments, the DMC 102 can employ one or more open source libraries to perform (e.g., automatically perform) the stemming or lemmatizing of entities 106.

A concept can be composed of multiple entities 106. In some embodiments, while the concept can be composed of multiple entities 106, a concept itself can be an entity 106. A concept can be provided (e.g., supplied or input) by a user to the DMC 102 (e.g., to the association inference model or the scoring model of the model component 202), wherein the user can provide an initial or expanded set (e.g., group) of keywords relating to the concept (e.g., concept of "advertising" or another desired concept or topic). In some embodiments, the model component 202 (e.g., the association inference model or scoring model of the model component 202) can infer or determine (e.g., using clustering or another desired technique) concepts and/or an initial or expanded set of keywords relating to a concept based at least in part on the results of analyzing the information from the data sources (e.g., electronic documents 104, data dictionaries 110, metadata 112, and/or external information 114).

A relationship 108 (e.g., edge) can be between two or more entities 106 of or associated with the electronic documents 104 or other information from other data sources (e.g., data dictionaries 110, metadata 112, and/or external information 114). As some non-limiting examples, a relationship 108 can be between two words or phrases identified in one or more data sources (e.g., electronic documents 104, data dictionaries 110, metadata 112, and/or external information 114), a relationship 108 can be between two or more data sources (e.g., between two or more electronic documents 104, or between a first data source (e.g., electronic document 104) and a second data source (e.g., data dictionary 110)), a relationship 108 can be between two or more concepts, a relationship can be between a concept and a word, phrase, or electronic document 104 (or other data source). For instance, a word that is a subject of a sentence can have a relationship 108 with another word that is a verb of the sentence (e.g., in the sentence: "The car can be purchased for twenty thousand dollars," the DMC 102 can determine that there is a relationship between the subject ("car") and the verb ("purchased") of the sentence and/or other relationships associated with the sentence). As another example, a word (e.g., a word relating to a concept) identified in a sentence of an electronic document 104 can have a relationship 108 with another word (e.g., another word relating to the concept) identified in another electronic document 104 or other data source (e.g., the DMC 102 can determine that a first word "income" in a first sentence of a first document can have a relationship with a second word "salary" in a second sentence of a second document). As some other non-limiting examples, with regard to datasets, such as datasets of or associated with databases or tables, a relationship 108 can be between two datasets that can share columns, a relationship

108 can be between two or more columns that can denote the same field in multiple different datasets, a relationship 108 can be between a first column of a first dataset (e.g., first table or database) and a second column of a second dataset (e.g., the first column and the second column have the same name, same data, or a portion of data is the same), a relationship 108 can be between a column of the first dataset and a row of the first dataset (e.g., the column and the row intersect each other in the dataset), a relationship 108 can be between an item of data and a row and a column of a dataset (e.g., the item of data is located in a cell where the row and column intersect), a relationship 108 can be between a first item of data and a second item of data that are in a same row or a same column of a dataset, and/or a relationship 108 can be another type of relationship, such as described herein.

In certain embodiments, the DMC 102 also can determine or obtain auxiliary information that can be related to the entities 106 and relationships 108. The auxiliary information can comprise or relate to, for example, entity (e.g., node) weights or relationship (e.g., edge) weights that the DMC 102 can apply to entities 106 or relationships 108 between entities, respectively, labels that can be applied to entities 106 or relationships 108, links to raw data (e.g., link to a raw data dictionary), version information relating to a version of information (e.g., version of an association inference model, version of a scoring model, version of an electronic document 104, version of a dictionary 110, or version of another type of information), metadata relating to entities 106 or relationships 108, such as date or publication of an electronic document 104, authors of an electronic document 104, or other metadata. The auxiliary information can be internal to a user (e.g., enterprise, company, or organization) or can be part of the external information 114.

With further regard to entity or relationship weights, the DMC 102, employing a weight component 206, can determine desired respective entity weights (e.g., node weights) to utilize for respective entities 106 and respective relationship weights (e.g., edge weights) to utilize for respective relationships 108 based at least in part on the results of analyzing information relating to the respective entities 106 and the respective relationships 108, and various factors, which can comprise an entity type of an entity 106, a relationship type of a relationship 108 between entities 106, a strength of a relationship 108 between entities 106, a level of significance (e.g., a determined level of criticality, importance, or interest) of an entity 106 or relationship 108 (e.g., with respect to a user or a concept), and/or other desired factors, as more fully described herein. As some non-limiting examples, the weight component 206 can determine desired entity or relationship weights (e.g., weight values) for entities 106 or relationships 108 between entities based at least in part on a level of importance or interest of or in the entity 106 or relationship 108 between entities in relation to a concept, whether an entity 106 is determined to match (e.g., satisfies a defined match criterion) or be relatively closely associated with (e.g., relatively closely related or similar to) a keyword associated with a concept, whether a relationship 108 between entities is determined to match (e.g., an entity of the relationship is determined to match) or be relatively closely associated with a keyword associated with a concept, or a location of an entity 106 within an electronic document 104 or other data source. As some other non-limiting examples, the weight component 206 can determine desired entity or relationship weights (e.g., weight values) that can be applied to entities 106 or relationships 108 between entities based at least in part on the number of columns that two datasets (e.g., database, table, or other dataset) share, the number of columns in a dataset, the number or rows two datasets share, the number of rows in a dataset, a version of the data source (e.g., electronic document 104, dictionary 110, or other data source) associated with the entity 106 or relationship 108, or other factors.

The weight component 206 can assign or apply the respective entity weights to the respective entities 106 and the respective relationship weights to the respective relationships 108. The DMC 102 can utilize the respective entity weights and respective relationship weights to facilitate determining new (e.g., subsequently identified or inferred) relationships (e.g., indirect or direct relationships) between new (e.g., subsequently identified) or existing entities of or associated with new or existing electronic documents 104 or other information from other data sources (e.g., data dictionaries 110, metadata 112, and/or external information 114), as more fully described herein.

In some embodiments, the DMC 102 (e.g., the model component 202 or another component of the DMC 102) can post-process the information relating to the entities 106 and relationships 108, and/or the information received from the data sources, based at least in part on (e.g., using or applying) desired thresholding or pruning techniques, to remove, mitigate, or reduce noise (e.g., noise in the data, such as outlier data) that may be in the information relating to the entities 106 and relationships 108, and/or the information received from the data sources, since noise in the data potentially can undesirably skew, or render incorrect or inaccurate, the results of data analysis and/or decisions based on such data analysis. For example, the DMC 102 can analyze such information and can apply desired threshold data values to such information to identify any items of information that can be outliers relative to other items of information (e.g., identify any items of information that satisfy (e.g., breach; or meet or exceed) an applicable threshold data value). The DMC 102 can remove any items of information determined to be outlier data from the information set. This can reduce, mitigate, or minimize incorrect or inaccurate results obtained from data analysis (e.g., incorrect or inaccurate inferences or determinations of relationships between entities, such as an incorrect or inaccurate inference of an indirect relationship between a concept and another concept).

In some embodiments, the model component 202 also can determine and create a scoring model that can embed the respective entities 106, the respective relationships 108 between entities, and/or desired information relating thereto, to a desired common representation, based at least in part on the results of an analysis of the information relating to the entities 106, the respective relationships 108 between entities, and/or the desired information (as indicated at reference numeral 308 of the data management process 300). The model component 202 can train the scoring model to be representative of the respective entities 106 and the respective relationships 108 between entities, wherein the model component 202 can continue to train and refine (e.g., improve) the scoring model over time as additional information, including feedback information (e.g., feedback information relating to decisions regarding or relating to determining relationships, such as indirect relationships between concepts or other entities made by a user or by another component of the DMC 102), is input to the scoring model over time, as more fully described herein.

In certain embodiments, as part of the analysis for the scoring model, the DMC 102 or user can create or determine (e.g., DMC 102 can automatically determine) an expanded keyword list 310 that can be expanded to include additional keywords based at least in part on concept keywords 312 of an initial keyword list, such as more fully described herein. The DMC 102 can input the expanded keyword list 310 (e.g., in the desired common representation) into the scoring model as part of the determining, creating, or updating (e.g., modifying) of the scoring model, based at least in part on the results of analysis of the expanded keyword list 310, concept keywords 312, entities 106, relationships 108 between entities, and/or other desired information (as indicated at reference numeral 314 of the data management process 300).

In some embodiments, as part of such analysis for the scoring model, the DMC 102 can utilize the AI component 204, which can apply desired AI techniques and algorithms, which can include graph mining techniques and algorithms, and can perform an AI analysis on the information regarding or relating to the entities 106, the respective relationships 108 between entities, the expanded keyword list 310, the concept keywords 312, and/or other desired information to map the structured or unstructured information relating to the entities 106 and relationships 108 to the desired common representation (e.g., a desired common structured format), as more fully described herein. The DMC 102 (e.g., the model component 202 or AI component 204 of the DMC 102) can input the structured information relating to the entities 106, the relationships 108, or other desired information, represented in the common representation, into the scoring model for analysis (e.g., AI, machine learning, neural network, or graph analysis), wherein the scoring model can be an AI-based scoring model (e.g., AI, machine learning, neural network, or graph based scoring model). The AI or graph mining techniques and algorithms employed by the AI component 204 can comprise, for example, Dijkstra's algorithm, Word2vec, Seq2vec, Sentence2vec, Dot2vec, fast-Text, or another desired AI technique or algorithm.

In some embodiments, in addition to the relationship information (e.g., connectivity information) regarding the relationships 108 between entities 106, the model component 202 and/or AI component 204, in connection with creating and utilizing the scoring model, can receive and analyze information, which can provide certain desired structural constraints, and, based at least in part on the results of such analysis, can determine additional structural constraints that can be applied to the scoring model. For example, in addition to the relationship information (e.g., connectivity information) regarding the relationships 108 between entities 106, the model component 202 and/or AI component 204, in connection with creating and utilizing the scoring model, can receive and analyze information relating to particular domains (e.g., domain-specific information) associated with respective portions of the information received from data sources, and, based at least in part on the results of such analysis, can determine additional structural constraints, which can be informed by the domain knowledge gained from analysis of the information relating to the particular domains. The model component 202 and/or AI component 204, in connection with creating and utilizing the embedding model, can apply the respective additional structural constraints in connection with respective relationships 108 between entities to make the embeddings of the respective entities 106 and the respective relationships 108 between entities more context-specific, which can enhance (e.g., improve) the embeddings of the respective entities 106 and the respective relationships 108 between entities. The model component 202 (e.g., employing the scoring model) and/or AI component 204 can apply the respective additional structural constraints, in connection with the respective relationships 108 between entities, when determining (e.g., computing) the embeddings of the scoring model or as a post-processing operation. In certain embodiments, in connection with applying the additional structural constraints and/or making the embeddings of the respective entities 106 and the respective relationships 108 between entities more context-specific, the model component 202 and/or AI component 204 can utilize clustering information determined or inferred by the model component 202 to respectively reweight shortest paths between respective entities 106. The model component 202 and/or AI component 204 can perform such reweighting of shortest paths between entities while determining (e.g., computing) association scores relating to associations between candidate entities (as described herein) or as a post-processing operation where the model component 202 and/or AI component 204 can modify (e.g., adjust) association scores relating to associations between candidate entities based at least in part on the reweighting of the shortest paths between candidate entities.

The model component 202 and/or the AI component 204, employing the scoring model, can evaluate the respective strengths or levels of association (e.g., relatedness or similarity) between respective entities 106 (e.g., terms or phrases) identified in or extracted from existing information (e.g., electronic documents 104, data dictionaries 110, metadata 112, external information 114, or other information) or from additional or new information (e.g., new or additional electronic documents 104 or other information) input to the model component 202 (e.g., input to the association inference model and/or scoring model) irrespective of whether the respective entities 106 share an edge with each other. That is, for example, even if a pair of entities 106 have not been identified as having a relationship (e.g., edge, such as a direct edge) with each other, the model component 202 and/or the AI component 204, employing the scoring model, can evaluate the strength or level of association between the pair of entities 106 to facilitate inferring or determining whether a relationship 108 (e.g., indirect relationship or edge) exists between the pair of entities 106. An indirect relationship can be a secondary (e.g., second level or order), tertiary (e.g., third level or order) or other higher level indirect or remote relationship between entities.

The model component 202 and/or the AI component 204, employing the scoring model, can determine candidate entities 106 for scoring (e.g., scoring the strength or level of association between candidate entities 106) based at least in part on the concepts (e.g., concepts that can make up the main scoring model or main portion of the scoring model), as determined from the analysis of the electronic documents 104 or other desired information, or can be obtained by using the expanded keyword list 310 (e.g., applying or inputting the expanded keyword list 310 to the scoring model). The model component 202 and/or the AI component 204, employing the scoring model, can determine (e.g., calculate) respective association scores (e.g., relatedness or similarity scores) relating to respective associations between respective pairs of candidate entities 106 and respective concepts associated therewith based at least in part on the results of analyzing the information regarding or relating to the scoring model, including the results of evaluating the respective strengths or levels of association between the respective pairs of candidate entities 106.

The model component 202 (e.g., the scoring model of the model component 202) can generate a group of the respective association scores relating to the respective associations between the respective pairs of candidate entities and the respective concepts associated therewith, and can provide (e.g., present or communicate) the group of the respective association scores as an output to an evaluation component 208 for evaluation by the evaluation component 208 or a user(s) (as indicated at reference numeral 316 of the data management process 300). The respective association scores relating to the respective associations between the respective pairs of candidate entities (and the respective concepts associated therewith) can be entity-level association scores (e.g., entity-entity association scores, such as term-term association scores, concept-concept association scores, concept-term association scores, or other types of entity-entity association scores).

In certain embodiments, the DMC 102 can comprise a ranking component 210 that can rank or order the respective association scores (e.g., respective entity-entity association scores) relating to the respective associations between the respective pairs of candidate entities 106 (and the respective concepts associated therewith) in a desired order, such as from highest association score to lowest association score. A relatively higher association score can indicate a stronger association between candidate entities 106, whereas a relatively lower association score can indicate a relatively weaker (e.g., lower level of) association between candidate entities 106. In some embodiments, the ranking component 210, model component 202, or other component of the DMC 102 can apply a desired threshold score (e.g., a desired minimum threshold score for inclusion in the group of respective association scores for output) to include relatively higher association scores that satisfy (e.g., meet or exceed; are greater than or equal to) the defined threshold score in the group for further evaluation and consideration and to not include, in the group, relatively lower association scores that do not satisfy (e.g., are lower than) the defined threshold score, since relatively lower association scores can indicate that an association between candidate entities is not sufficiently strong. The ranking component 210 can present the ranked group of the respective association scores (e.g., entity-level association scores) relating to the respective associations between the respective pairs of candidate entities (and the respective concepts associated therewith) to the evaluation component 208 for evaluation by the evaluation component 208 or the user(s).

The evaluation component 208 can aggregate and evaluate the respective entity-level association scores of the group of entity-level association scores relating to the respective associations between the respective pairs of candidate entities 106 (and the respective concepts associated therewith), and can determine (e.g., calculate or infer) respective concept-level association scores between respective concepts based at least in part on (e.g., as a function of) the respective association scores of the respective associations between the respective pairs of candidate entities (and the respective concepts associated therewith) (as indicated by the reference numeral 318 of the data management process 300). For example, the group of entity-level association scores can comprise a first subgroup of entity-level association scores relating to first respective associations between respective pairs of candidate entities 106 that can be associated with a first pair of concepts, a second subgroup of entity-level association scores relating to second respective associations between respective pairs of candidate entities 106 that can be associated with a second pair of concepts, and/or one or more other subgroups of entity-level association scores that can be associated with one or more other pairs of concepts. The evaluation component 208 can determine a first concept-level (e.g., concept-concept) association score relating to the first pair of concepts based at least in part on (e.g., as a function of) the first subgroup of entity-level association scores relating to the first respective associations between respective pairs of candidate entities 106. The evaluation component 208 also can determine a second concept-level association score relating to the second pair of concepts based at least in part on the second subgroup of entity-level association scores relating to the second respective associations between respective pairs of candidate entities 106. In determining a concept-level association score, the evaluation component 208 can determine (e.g., calculate or infer) the concept-level association score relating to a pair of concepts, for example, as a sum of, as an average of, as a median of, as a combination of, or otherwise as a function of, entity-level association scores of a subgroup of entity-level association scores of candidate entities associated with the pair of concepts, in accordance with the defined data management criteria. The first pair of concepts can be concepts for which a relationship between such concepts has not been previously identified or established. The second pair of concepts also can be concepts for which a relationship between such concepts has not been previously identified or established. That is, for example, prior to the analysis by the DMC 102, there can be no relationship (e.g., direct relationship) identified between the concepts of the first pair of concepts, and no relationship (e.g., direct relationship) identified between the concepts of the second pair of concepts.

In some embodiments, as desired, the DMC 102 (e.g., the evaluation component 208 of the DMC 102) can determine or generate hierarchical levels of concept-level association scores, for example, n-th level concept associations, by successively combining concept-level associations up to a desired hierarchical level (e.g., up to an (n−1)th level), wherein n can be virtually any desired integer value. For instance, at the n=1 level, there can be respective entity-level association scores relating to respective associations between respective pairs of candidate entities 106, such as described herein. At the n=2 level of the hierarchy, the evaluation component 208 can determine (e.g., calculate or infer) respective concept-level association scores relating to respective pairs of concepts (e.g., the first concept-level association score relating to the first pair of concepts, the second concept-level association score relating to the second pair of concepts, and/or another concept-level association score relating to another pair of concepts) based at least in part on (e.g., as a function of and/or by combining) respective subgroups of entity-level association scores relating to respective associations between respective pairs of candidate entities 106 associated with respective pairs of concepts, such as described herein.

At the n=3 level of the hierarchy, the evaluation component 208 can combine second-level (e.g., n=2 level) concept-level association scores associated with respective pairs of concepts to generate a third-level (e.g., n=3 level) concept-level association score relating to the respective pairs of concepts. For instance, the evaluation component 208 can determine (e.g., calculate or infer) a third-level concept-level association score relating to the respective pairs of concepts (e.g., a first pair of concepts and a second pair of concepts) based at least in part on (e.g., as a function of and/or as a combination of) a first second-level concept-level association score associated with the first pair of concepts and a second second-level concept-level association score associated with the second pair of concepts. If desired, at the n=4 level of the hierarchy, the evaluation component 208 can combine third-level (e.g., n=3 level) concept-level association scores associated with respective groupings of concepts to generate a fourth-level (e.g., n=4 level) concept-level association score relating to the respective groupings of concepts. For example, the evaluation component 208 can determine a fourth-level concept-level association score relating to the respective groupings of concepts (e.g., a first grouping of concepts and a second grouping of concepts) based at least in part on (e.g., as a function of and/or as a combination of) a first third-level concept-level association score associated with the first grouping of concepts and a second third-level concept-level association score associated with the second grouping of concepts.

In accordance with various embodiments, the evaluation component 208 can evaluate (e.g., automatically evaluate) or a user(s) can evaluate the respective concept-level association scores (e.g., the first concept-level association score, second concept-level association score, or other concept-level association score) relating to the respective associations between the respective pairs of candidate concepts to facilitate determining, with regard to each pair of candidate concepts, whether the association (e.g., relatedness, connectiveness, or similarity) between the concepts of the pair of candidate concepts are strong enough to indicate that there is a relationship between the pair of candidate concepts (as also indicated by the reference numeral 318 of the data management process 300). In some embodiments, the ranking component 210 can rank or order the respective concept-level association scores (e.g., respective concept-concept association scores) relating to the respective associations between the respective pairs of candidate concepts in a desired order, such as from highest concept-level association score to lowest concept-level association score, to facilitate the evaluation. In a similar manner, if higher hierarchical level concept-level association scores have been determined, the evaluation component 208 can evaluate, or a user(s) can evaluate, the respective higher hierarchical level concept-level association scores relating to the respective associations between the respective pairs or groupings of candidate concepts to facilitate determining, with regard to each pair or groupings of candidate concepts, whether the association (e.g., relatedness, connectiveness, or similarity) between the concepts of the pair or groupings of candidate concepts are strong enough to indicate that there is a relationship between the pair or groupings of candidate concepts.

Based at least in part on the results of such evaluation of the respective concept-level association scores and/or a defined threshold (e.g., minimum threshold) concept-level association score, with regard to each concept-level association score, the evaluation component 208 or the user(s) can determine (e.g., automatically determine) whether the pair (or groupings) of candidate concepts associated with the concept-level association score are related to each other (e.g., have a relationship 108 with each other), in accordance with the defined data management criteria. In certain embodiments, with regard to each concept-level association score, if the evaluation component 208 (or the user(s)) determines that the concept-level association score satisfies (e.g., meets or exceeds; is greater than or equal to) the defined threshold concept-level association score, the evaluation component 208 (or the user(s)) can determine that the concepts associated with the concept-level association score have a relationship 108 with each other. If the evaluation component 208 (or the user(s)) determines that the concept-level association score does not satisfy (e.g., is less than) the defined threshold concept-level association score, the evaluation component 208 (or the user(s)) can determine that the concepts associated with the concept-level association score do not have a relationship with each other.

In some embodiments, if the evaluation component 208 evaluates and makes relationship determinations regarding the respective concept-level association scores associated with the respective pairs (or groupings) of candidate concepts, the evaluation component 208 can provide information regarding or relating to the relationship determinations (e.g., determinations regarding relationships between concepts) made by the evaluation component 208 to the user(s) (e.g., to the communication device 116 of the user 118) for review or further evaluation by the user(s) 118. The user(s) 118 can review or evaluate the respective concept-level association scores associated with the respective pairs (or groupings) of candidate concepts, the relationship determinations made by the evaluation component 208, and/or information relating thereto. Based at least in part on the results of such reviewing or evaluating by the user(s) 118, the user(s) 118 can make the user's own relationship determinations regarding the respective concept-level association scores associated with the respective pairs (or groupings) of candidate concepts to indicate, with regard to each pair (or groupings) of candidate concepts, whether there is a relationship between a pair (or groupings) of concepts. For instance, with regard to a pair (or groupings) of candidate concepts and associated concept-level association score, the user(s) 118 can determine whether the user(s) 118 agrees with the relationship determination regarding the pair (or groupings) of candidate concepts made by the evaluation component 208 or instead desires to make a different relationship determination regarding the pair (or groupings) of candidate concepts (e.g., desires to override the relationship determination made by the evaluation component 208).

In certain embodiments, the disclosed subject matter can employ crowd sourcing, involving a group of users, to facilitate making relationship determinations regarding concepts. For instance, the DMC 102 or the communication device 116 can communicate the information relating to pairs (or groupings) of candidate concepts to desired communication devices associated with users of the group of users to have such users evaluate respective concept-level association scores relating to respective associations between respective pairs (or groupings) of candidate concepts to facilitate determining, with regard to each pair (or groupings) of candidate concepts, whether the association (e.g., relatedness, connectiveness, or similarity) between the concepts of the pair (or groupings) of candidate concepts are strong enough to indicate, infer, or determine that there is a relationship between the pair (or groupings) of candidate concepts. The users can provide (e.g., communicate via their communication devices) information regarding their relationship determinations regarding the pairs (or groupings) of candidate concepts or other feedback information relating thereto to the DMC 102 and/or the communication device 116.

The DMC 102, including the association inference model and/or scoring model, can receive feedback information regarding or relating to the relationship determinations made by the evaluation component 208, user 118, or the group of users from the evaluation component 208, the communication device 116 associated with the user 118, or communication devices associated with the group of users, and the association inference model and/or scoring model can be updated based at least in part on the feedback information (as indicated at reference numerals 320 and 322 of the data management process 300). Updating the association inference model and/or scoring model using the feedback information regarding or relating to the relationship determinations made by the evaluation component 208, user 118, or the group of users can enhance (e.g., improve, enrich, or optimize) the association inference model and/or the scoring model. For instance, the feedback information can be used to form new associations (e.g., connections) between concepts of the association inference model based at least in part on the feedback information regarding or relating to the relationships 108 between concepts determined by the evaluation component 208, user 118, and/or group of users, which can enhance the association inference model and/or scoring model, and can enhance (e.g., improve, make more accurate, or optimize) future analyses of electronic documents 104 or other information (e.g., from other data sources, such as the data dictionaries 110, metadata 112, or external information 114), association scoring determinations (e.g., entity-level association scoring determinations and/or concept-level association scoring determinations) by the scoring model, and relationship determinations or inferences regarding relationships between candidate concepts (e.g., by the evaluation component 208).

With further regard to using the feedback information to update the association inference model and/or scoring model, in response to the model component 202 (e.g., the association inference model and/or scoring model) receiving the feedback information from the user 118 (or other users) or the evaluation component 208, the model component 202, employing the association inference model and/or scoring model, and/or the AI component 204 can analyze the feedback information to facilitate determining whether any modifications (e.g., adjustments or changes) are to be made to the association inference model and/or scoring model, relationships 108 between entities 106 associated with the association inference model and/or scoring model, and/or weights associated with the entities 106 or relationships 108.

For instance, if the evaluation component 208, user 118, or group of users made a relationship determination regarding a pair of candidate concepts associated with a higher association score (e.g., a higher association score that satisfied the defined threshold concept-level association score), accordingly, based at least in part on the results of analyzing the feedback information, the model component 202 and/or the AI component 204 can determine that the association inference model and/or scoring model is desirably structured with regard to the current information and no modification is to be made to the association inference model and/or scoring model with regard to the current information of the models (e.g., current model information, relationships 108 between entities associated with the association inference model and/or scoring model, and/or weights associated with the entities 106 or relationships 108), when doing so is in accordance with the defined data management criteria. In some instances, alternatively, the model component 202 and/or the AI component 204 can determine that the embedding model, the relationships 108 between entities, and/or the weights are to be modified such that the probability or association score(s) (e.g., concept-level association score or underlying entity-level association scores) associated with the pair of candidate concepts with respect to future instances involving the concepts or underlying entities 106 (or similar entities) can be increased, and/or conversely, the probabilities or association scores (e.g., lower concept-level association scores that do not satisfy the defined threshold concept-level association score) associated with the other candidate concepts can be decreased, when doing so is in accordance with the defined data management criteria.

If, instead, the user 118 made a relationship determination with regard to a pair of candidate concepts that is different from the evaluation and/or relationship determination regarding the pair of candidate concepts made by the evaluation component 208 (whether because the evaluation component 208 did not make a relationship determination regarding the pair of candidate concepts or because the user 118 overrode the relationship determination regarding the pair of candidate concepts made by the evaluation component 208), accordingly, based at least in part on the results of analyzing such feedback information, the model component 202 and/or the AI component 204 can determine that the association inference model and/or scoring model, the relationships 108 between entities, and/or the weights are to be modified such that one or more of the factors (e.g., structure of the model(s), relationships 108 between entities, and/or weight values), which resulted in or caused the concept-level association score regarding the pair of candidate concepts to be as high as it is or the underlying entity-level association scores to be as high as they are, can be changed or downgraded in influence with respect to determination of concept-level or entity-level association scores with regard to those candidate concepts or other concepts (e.g., similar concepts to the candidate concepts), when doing so is in accordance with the defined data management criteria. For example, in such instances, the model component 202 and/or the AI component 204 can determine that the structure of the association inference model and/or scoring model, the relationships 108 between entities, and/or the weights are to be modified such that, in future instances involving the candidate concepts, concepts similar to the candidate concepts, entities relating to the candidate concepts or similar entities, concept-level association scores or entity-level association scores can be relatively lower as compared to the concept-level association score or the underlying entity-level association scores associated with the pair of candidate concepts. The model component 202 can save and store any changes to the association inference model and/or scoring model, the relationships 108 between entities, and/or the weights in the data store 212 of or associated with the DMC 102.

In some embodiments, the DMC 102 can comprise a version control component 214 that can store version information relating to the association inference model and/or scoring model and/or the updates (e.g., modifications) to the information of or associated with the association inference model and/or scoring model in the data store 212 (e.g., in a version control system, repository, or database of the data store 212) (as indicated at reference numeral 324 of the data management process 300). The version control component 214 can store and maintain previous versions of the association inference model and/or scoring model and/or updates to the information of or associated with the association inference model and/or scoring model in the data store 212 to enable the DMC 102 or user(s) 118 to access the previous versions of the association inference model and/or scoring model and/or previous versions of updates to the association inference model and/or scoring model, if and as desired, for example, for review or evaluation, or to facilitate determining a data relationship between a pair of candidate concepts or a relationship between a pair of candidate entities.

In some embodiments, to facilitate maintaining desirably high quality of the information stored in the association inference model, the scoring model, the databases, the tables, and/or other data storage locations, the system 100 can comprise (e.g., optionally can comprise) a quality control component 120 that can be associated with (e.g., communicatively connected to) the DMC 102 and can monitor the evaluations, relationship determinations associated with concepts or other entities, and/or decisions made with regard to relationship determinations by the DMC 102 or users (e.g., user 118) and/or other information of or associated with the association inference model, the scoring model, the databases, the tables, and/or other data storage locations. The quality control component 120 can evaluate and/or manage the quality of such evaluations, relationship determinations, and/or decisions by the DMC 102 or users to facilitate maintaining a desirably high quality level for data management, including the evaluations, relationship determinations (e.g., automated relationship determinations), and/or decisions (e.g., automated decisions to update data) by the DMC 102 or users and a desirably high quality level of the information stored in the association inference model, the scoring model, the databases, the tables, and/or other data storage locations of or associated with the system 100.

For instance, the quality control component 120 can monitor relationship determinations relating to candidate concepts or other candidate entities (e.g., automated determinations by the evaluation component 208 or manual determinations by users), determinations or decisions (e.g., automated or manual determinations or decisions) relating to bias, fairness, transparency or privacy, and/or updates (e.g., data modifications) made to databases or tables managed and updated by the DMC 102, including, in particular, automated updates made to the databases or tables by the DMC 102, and the downstream effect of such determinations, decisions, or updates on applications, services, systems, other databases or tables, and/or users that are utilizing the information relating to such determinations, decisions, or updates. The quality control component 120 can evaluate such information relating to such determinations, decisions, or updates and their downstream effect on the applications, services, systems, databases, tables, and/or users that are utilizing the information relating to such determinations, decisions, or updates based at least in part on application of a set of performance indicators (e.g., key performance indicators (KPIs)) relating to information or database quality to such evaluation, wherein the set of performance indicators can comprise performance indicators relating to the correctness of the information, including updated information, in the databases or tables managed by the DMC 102, and/or any errors, disruptions, or other negative effects resulting from use of the information, including the updated information, stored in the databases or tables managed by the DMC 102 by the applications, services, systems, other databases or tables, and/or users downstream from such databases or tables managed by the DMC 102.

If, based at least in part on the results of such evaluation and application of the set of performance indicators, the quality control component 120 determines that no negative effects, or at least no threshold level of negative effects (e.g., no threshold number of data errors, or no threshold number of disruptions of operations), have been detected with regard to the information, including the updated information, stored in the databases or tables managed by the DMC 102, the quality control component 120 can determine that the quality level for data management, including the evaluations, determinations, and decisions (e.g., automated determinations and decisions relating to relationship determinations or updating information) made by the DMC 102 or users (e.g., user 118), is at a desirably high quality level. If, instead, based at least in part on the results of such evaluation and application of the set of performance indicators, the quality control component 120 determines that there are some negative effects (e.g., a threshold level of negative effects) that have been detected with regard to the information, including the updated information, stored in the databases or tables managed by the DMC 102, the quality control component 120 can determine that the quality level for data management, including the evaluations, determinations, and decisions (e.g., automated determinations and decisions relating to relationship determinations or updating information) made by the DMC 102 or users (e.g., user 118), is not achieving (e.g., is below) the desired high quality level, and can generate a quality control alert (e.g., quality control flag) and information relating to the quality control problems (e.g., data errors, disruptions, or other problems). For example, if, based at least in part on the results of such evaluation and application of the set of performance indicators, the quality control component 120 identifies that an application(s), service(s), system(s), other database(s), and/or user(s) utilizing the information (e.g., updated information) from the databases or tables managed and updated by the DMC 102 is or are experiencing errors, disruptions (e.g., disruption in operations), or other negative effects as a result of utilizing such information (e.g., updated information), the quality control component 120 can determine that the quality level for data management by the DMC 102 or users (e.g., user 118) associated therewith, is not achieving the desired high quality level, and can generate a quality control alert regarding the quality control problems (e.g., the negative effects) and information relating thereto. The quality control component 120 can present (e.g., communicate) the quality control alert and the information relating to the quality control problems to a communication device(s) (e.g., communication device 116) or interface(s) associated with a user(s) (e.g., user 118) to notify the user(s) of the quality control problems associated with the data management by the DMC 102 so that the user(s) can perform further analysis or evaluation of the quality control problems to mitigate (e.g., rectify, minimize, and/or correct) the quality control problems.

In certain embodiments, the DMC 102 can comprise or be associated with (e.g., optionally can comprise or be associated with) a bias management component 216 that can detect, manage, mitigate, and/or facilitate mitigating bias, and ensuring fairness, transparency, and/or privacy with regard to bias and/or attributes (e.g., sensitive, personal, individual, demographic, and/or other attributes associated with users), that potentially may occur in the handling and processing of data (e.g., new and subsequently processed data) by the DMC 102 (e.g., by the models of the model component 202 or AI component 204) and/or that potentially may occur in electronic documents 104 or other information, for example, due in part to undesirably biased data elements that are in the electronic documents 104, databases, tables, or other information being analyzed or managed by the DMC 102 and/or that are used to train the models of the model component 202. The attributes (e.g., demographic and/or sensitive attributes or characteristics) can relate to, for example, income, wealth, home ownership, gender, age, marital status, family size or status, health and/or disability status, race, ethnicity, religion, sexual orientation, education status, employment status, geographical location status (e.g., location of home, location of person, location of employment, or other type of location), personal property, and/or other attributes that can be associated with persons.

For instance, the data (e.g., electronic documents 104 and/or other information) analyzed by the DMC 102 and used to determine, generate, or train the models (e.g., association inference model or scoring model) potentially can contain biased data elements, which can be undesirably biased (e.g., demographically biased) with regard to one or more attributes (e.g., demographic, such as a protected demographic, and/or sensitive attributes). In addition to the electronic documents 104 and/or other information potentially containing undesirably biased data elements, such undesirable bias also potentially can introduce undesired (e.g., unwanted, improper, or unfair) bias into the operations and models of the DMC 102, which potentially can produce undesirable (e.g., unwanted, improper, unfair, or erroneous) biased results (e.g., undesirable determinations regarding relationships between entities, undesirable data modifications to data, or other undesirable results).

In some embodiments, the bias management component 216 (e.g., in conjunction with the model component 202, AI component 204, and/or evaluation component 208) can monitor, analyze, and/or evaluate data elements of the data (e.g., electronic documents 104 and/or other information) analyzed by the DMC 102, input information of users (e.g., input information of user 118 or another user(s) with regard to entities 106, relationships 108 between entities, concepts, bias, fairness, transparency, privacy, or other matters), and/or other desired data with respect to concepts, bias, fairness, transparency, and/or privacy issues associated with the data or persons (e.g., customers, employees, organizations, enterprises, companies, or subjects of a paper or other writing). Based at least in part on such monitoring, analysis, and/or evaluation, the bias management component 216 (e.g., in conjunction with the model component 202, AI component 204, and/or evaluation component 208) can detect, infer, determine, or identify whether there is or at least potentially may be undesirable issues relating to bias, fairness, transparency, or privacy in the data elements, or electronic documents 104 or other information overall, being processed by the DMC 102 or used to train the models of the DMC 102, and/or whether there is or at least potentially may be undesired bias being introduced into the operations, inferences, or determinations made by the DMC 102 or associated models.

In some embodiments, the bias management component 216 (e.g., in conjunction with the model component 202, AI component 204, and/or evaluation component 208) can employ certain electronic documents, concept information relating to certain concepts, and/or certain other desired information to facilitate identifying undesirable issues relating to bias, fairness, transparency, or privacy in the data elements, or electronic documents 104 or other information overall. For example, the bias management component 216 (e.g., in conjunction with the model component 202, AI component 204, and/or evaluation component 208) can utilize certain electronic documents relating to the concepts of bias, fairness, transparency, or privacy, and/or concept information, such as an expanded group of keywords (in addition to an initial group of keywords) relating to certain concepts the concepts of bias, fairness, transparency, or privacy in connection with a group of electronic documents 104 and/or other information (e.g., information from other data sources, such as data dictionaries 110, metadata 112, or external information 114) to facilitate identifying or detecting undesirable or potentially undesirably issues relating to bias, fairness, transparency, or privacy in the group of electronic documents 104 and/or the other information overall, and/or data elements therein. For instance, the bias management component 216 can apply the certain electronic documents and the concept information (e.g., initial and/or expanded group of keywords) relating to the concepts of bias, fairness, transparency, or privacy, along with the group of electronic documents 104 and/or the other information, wherein the DMC 102 (e.g., employing the model component 202 and/or AI component 204) can analyze the group of electronic documents 104 and/or the other information, and, as part of the analysis, also can analyze the certain electronic documents and the concept information relating to the concepts of bias, fairness, transparency, or privacy. The DMC 102 (e.g., employing the model component 202 and/or AI component 204) can determine and generate the association inference model and scoring model based at least in part on the results of such analysis, in accordance with the defined data management criteria, as more fully described herein.

The DMC 102 (e.g., employing the model component 202, AI component 204, and/or evaluation component 208) can determine (e.g., calculate) entity-level association scores relating to pairs of entities associated with various concepts, based at least in part on the information associated with the scoring model. Since the certain electronic documents and the concept information relating to the concepts of bias, fairness, transparency, or privacy were part of the initial analysis and the generation of the association inference model and scoring model, some of the entity-level association scores can relate to certain relationships (e.g., relationships 108) between respective pairs of entities, wherein some of the entities 106 can relate to the concepts of bias, fairness, transparency, or privacy. The DMC 102 (e.g., employing the model component 202, AI component 204, and/or evaluation component 208) also can determine a concept-level (e.g., concept-to-concept) association score(s) associated with a candidate pair(s) of concepts based at least in part on (e.g., as a function of) the entity-level association scores, as more fully described herein, wherein at least one of the concepts in the candidate pair(s) of concepts can relate to bias, fairness, transparency, or privacy.

For each concept-level association score, the bias management component 216 or evaluation component 208 (and/or a user(s) 118) can evaluate the concept-level association score associated with the candidate pair of concepts, wherein, again, a concept of the candidate pair(s) of concepts can relate to bias, fairness, transparency, or privacy. Based at least in part on the concept-level association score associated with the candidate pair of concepts and/or the defined threshold concept-level association score, the evaluation component 208 (and/or the user(s) 118) can infer, determine, detect, or identify whether there is an issue or at least potential issue (e.g., undesirable issue) relating to bias, fairness, transparency, or privacy in some of the electronic documents 104 of the group of electronic documents and/or the other information (e.g., information from other data sources, such as data dictionaries 110, metadata 112, or external information 114).

If the bias management component 216 or evaluation component 208 (and/or a user(s) 118) determines that the concept-level association score associated with the pair of candidate concepts satisfies the defined threshold concept-level association score or otherwise satisfies the applicable data management criteria, the bias management component 216 or evaluation component 208 (and/or a user(s) 118) can infer or determine that there is a relationship 108 between the two concepts. Since one of those concepts related to bias, fairness, transparency, or privacy, the bias management component 216 or evaluation component 208 (and/or a user(s) 118) also can infer or determine that the other concept of the candidate pair can relate to bias, fairness, transparency, or privacy, at least in some way, and the electronic documents 104 and/or other information relating to that other concept can relate to bias, fairness, transparency, or privacy, at least in some way.

From an analysis of the information relating the candidate pair of concepts, including information associated with the electronic documents and/or other information relating to that other concept of the candidate pair, the concept-level association score and the entity-level association scores associated with that other concept or underlying information relating thereto, the bias management component 216 or evaluation component 208 (and/or a user(s) 118) can infer or determine the degree (e.g., level or amount) of the issue relating to bias, fairness, transparency, or privacy associated with the electronic documents and/or other information relating to that other concept, and/or whether such issue relating to bias, fairness, transparency, or privacy is or potentially is undesirable and/or problematic.

If an instance of an issue or potential issue relating to bias, fairness, transparency, or privacy associated with some of the electronic documents 104 and/or other information is detected, inferred, determined, or identified by the bias management component 216 (or evaluation component 208 or user(s) 118), and/or determines that such issue is or potentially is undesirable and/or problematic, the bias management component 216 can determine that an alert (e.g., a bias, fairness, transparency, or privacy alert, or a quality control alert) is to be generated to provide a notification of such issue or potential issue relating to bias, fairness, transparency, or privacy. In response, the bias management component 216 can generate the alert and can generate or aggregate information relating to the issue or potential issue relating to bias, fairness, transparency, or privacy, and can present (e.g., communicate) the alert and the information relating to the issue or potential issue relating to bias, fairness, transparency, or privacy to a communication device(s) (e.g., communication device 116) or interface(s) associated with a user(s) (e.g., user 118 or other user(s)) to notify the user(s) of the issue or potential issue relating to bias, fairness, transparency, or privacy associated with some of the electronic documents 104 and/or other information (e.g., documents or other information associated with that other concept of the candidate pair of concepts) and/or associated with data management by the DMC 102 generally, so that the user(s) can perform further analysis or evaluation of such issue or potential issue to determine whether a mitigation action is to be performed to mitigate the issue or potential issue relating to bias, fairness, transparency, or privacy to mitigate (e.g., rectify, minimize, and/or correct) such issue or potential issue, or other quality control problems relating thereto. Such monitoring and mitigating of bias or potential bias by the bias management component 216 can facilitate mitigating (e.g., reducing, minimizing, or eliminating) undesired issues relating to bias, fairness, transparency, or privacy in the data associated with the system 100 and can facilitate maintaining a desirably high quality level of the processing of data by the DMC 102 and a desirably high quality of the documents, databases, tables, and data stored therein.

In some embodiments, the DMC 102, or another system associated with the DMC 102, and/or a user(s) (e.g., user 118) can utilize information relating to the detecting of an issue relating to bias, fairness, transparency, or privacy for content moderation to mitigate such issue relating to bias, fairness, transparency, or privacy. For instance, in response to detecting such issue relating to bias, fairness, transparency, or privacy, the DMC 102, and/or the user(s) can perform a mitigation action to moderate the content (e.g., remove, edit, or modify all or certain portions of the content)

associated with such issue relating to bias, fairness, transparency, or privacy to mitigate such issue.

If, instead, the bias management component 216 or evaluation component 208 (and/or a user(s) 118) determines that the concept-level association score associated with the pair of candidate concepts does not satisfy the defined threshold concept-level association score or otherwise does not satisfy the applicable data management criteria, the bias management component 216 or evaluation component 208 (and/or a user(s) 118) can infer or determine that there no relationship has been established between the two concepts of the candidate pair of concepts. Since one of those concepts related to bias, fairness, transparency, or privacy, the bias management component 216 or evaluation component 208 (and/or a user(s) 118) also can infer or determine that no issue or potential issue relating to bias, fairness, transparency, or privacy has been established or detected with regard to the other concept of the candidate pair or the electronic documents 104 and/or other information relating to that other concept.

In addition to monitoring, evaluating, and managing issues relating to bias, fairness, transparency, and/or privacy, the DMC 102, or another system associated with the DMC 102, and/or a user(s) (e.g., user 118) can utilize the information regarding the respective relationships 108 between respective concepts, and/or the respective relationships 108 between respective entities 106, for any of a number of other desirable uses, such as described herein. For instance, the DMC 102, the other system, and/or the user(s) can utilize such information regarding the respective relationships 108 between respective concepts and/or the respective relationships 108 between respective entities 106 to desirably enhance (e.g., improve or optimize) content moderation, to desirably enhance operational efficiency (e.g., enhance budget allocation, cross-team collaboration, or career intelligence), and/or for other desired uses, such as more fully described herein.

As an example relating to operational efficiency, an enterprise can have a first department involved with a first project and a second department involved in a second project, where the first project and second project are disparate and have no apparent relationship to each other (e.g., the first project and second project deal with different types of concepts) and/or where the first team members of the first department do not have a regular interaction with second team members of the second department. The DMC 102, employing the techniques and models described herein, can analyze first information relating to the first department and first project and second information relating to the second department and second project. Based at least in part on the results of the analysis, including utilizing the association inference model and scoring model as part of the analysis, the DMC 102 can identify or infer a relationship between the first project and the second project with regard to resources, even though they are quite different from each other (e.g., the first project and the second project are vying for some of the same resources (e.g., financial resources (e.g., money for their budgets), computing resources, human resources, or other resources) of or associated with the enterprise. The DMC 102, the other system, and/or the user(s) can utilize the information relating to the relationship identified between the first project and second project, and/or other related information, to make determinations or decisions regarding the allocation of resources between the first project (or first department) and the second project (or second department).

As another example, additionally or alternatively, from the analysis results and information relating to the relationship between the first project and second project, the DMC 102 can determine that the first department has certain data relating to the first project that also can have some relevance to the second project being performed by the second department. Based on this, the DMC 102, the other system, and/or the user(s) can arrange for a collaboration between the first team members of the first department and the second team members of the second department, and/or to have the first team members share the certain data relating to the first project with the second team members to assist the second team members with performing their second project.

With further regard to FIGS. 1 and 2, in certain embodiments, the DMC 102 also can comprise an operations manager component 218 that can control (e.g., manage) operations associated with the DMC 102. For example, the operations manager component 218 can facilitate generating instructions to have components (e.g., model component 202, AI component 204, weight component 206, evaluation component 208, ranking component 210, data store 212, version control component 214, bias management component 216, and/or processor component 220) of or associated with the DMC 102 perform operations, and can communicate respective instructions to such respective components of or associated with the DMC 102 to facilitate performance of operations by the respective components of or associated with the DMC 102 based at least in part on the instructions, in accordance with the defined data management criteria and the defined data management algorithm(s) (e.g., data management algorithms, AI, machine learning, or neural network algorithms, and/or other algorithms, as disclosed, defined, recited, or indicated herein by the methods, systems, and techniques described herein). The operations manager component 218 also can facilitate controlling data flow between the respective components of the DMC 102 and controlling data flow between the DMC 102 and another component(s) or device(s) (e.g., devices or components, such as a communication device, a network device, or other component or device) associated with (e.g., connected to) the DMC 102.

The DMC 102 also can comprise a processor component 220 that can work in conjunction with the other components (e.g., model component 202, AI component 204, weight component 206, evaluation component 208, ranking component 210, data store 212, version control component 214, bias management component 216, and/or operations manager component 218) to facilitate performing the various functions of the DMC 102. The processor component 220 can employ one or more processors, microprocessors, or controllers that can process data, such as information relating to electronic documents, tables, databases, charts, online documents (e.g., web pages), entities (e.g., words, phrases, documents, or concepts), data elements, relationships between entities, entity weights, relationship weights, metadata, character recognition, association inference models, scoring models (e.g., association, relevance, or similarity scoring models), bias detection, management, and mitigation, notifications, communication devices, policies and rules, users, services, defined data management criteria, traffic flows, signaling, algorithms (e.g., data management algorithms, AI, machine learning, or neural network algorithms, graph mining algorithms, and/or other algorithms), protocols, interfaces, tools, and/or other information, to facilitate operation of the DMC 102, as more fully disclosed herein, and control data flow between the DMC 102 and other components (e.g., network components of or associated with the communication network, or communication devices) and/or associated applications associated with the DMC 102.

With further regard to the data store 212, the data store 212 can store data structures (e.g., user data, metadata), code structure(s) (e.g., modules, objects, hashes, classes, procedures) or instructions, information relating to electronic documents, tables, databases, charts, online documents (e.g., web pages), entities (e.g., words, phrases, documents, or concepts), data elements, relationships between entities, entity weights, relationship weights, metadata, character recognition, association inference models, scoring models (e.g., association, relevance, or similarity scoring models), bias detection, management, and mitigation, notifications, communication devices, policies and rules, users, services, defined data management criteria, traffic flows, signaling, algorithms (e.g., data management algorithms, AI, machine learning, or neural network algorithms, graph mining algorithms, and/or other algorithms), protocols, interfaces, tools, and/or other information, to facilitate controlling operations associated with the DMC 102. In an aspect, the processor component 220 can be functionally coupled (e.g., through a memory bus) to the data store 212 in order to store and retrieve information desired to operate and/or confer functionality, at least in part, to the DMC 102 and its components, and the data store 212, and/or substantially any other operational aspects of the DMC 102.

It should be appreciated that the data store 212 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 4:
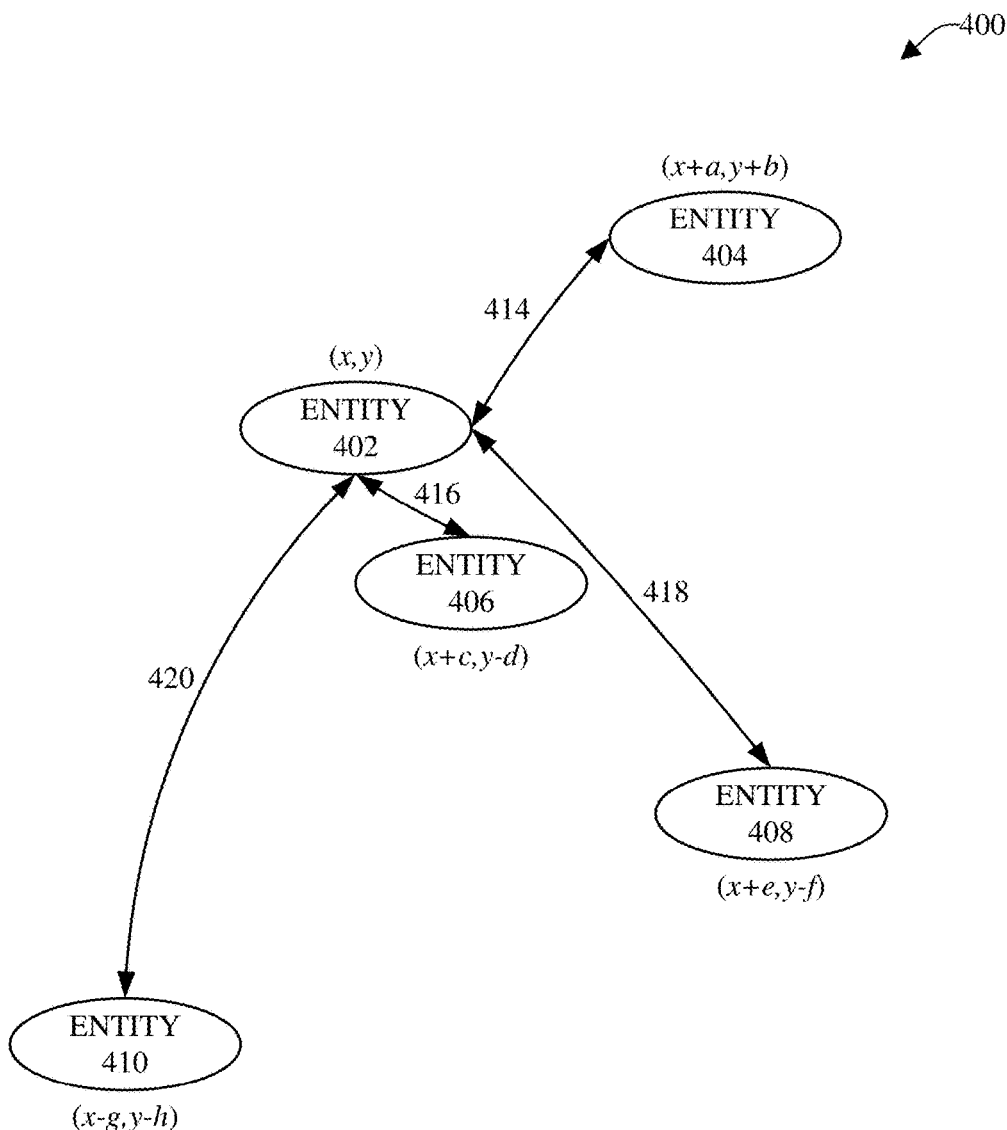
FIG. 4 depicts a diagram of an example, non-limiting entity relationship mapping, in accordance with various aspects and embodiments of the disclosed subject matter.

Referring now to FIG. 4 (along with FIGS. 1-3), FIG. 4 depicts a diagram of an example, non-limiting entity relationship mapping 400, in accordance with various aspects and embodiments of the disclosed subject matter. In some embodiments, the model component 202 and/or AI component 204 can generate entity relationship mappings, such as the example entity relationship mapping 400, to map respective relationships between respective entities associated with electronic documents, tables, or databases. For instance, based at least in part on the results of analyzing (e.g., performing an AI analysis on) electronic documents (e.g., 104), tables (e.g., 106), or databases (e.g., 108), information from other data sources (e.g., data dictionaries 110, metadata 112, or external information 114), and/or auxiliary information (e.g., entity weights or relationship weights), the model component 202 and/or AI component 204 can determine respective relationships between respective entities of or associated with the electronic documents, tables, or databases, information from other data sources (e.g., data dictionaries 110, metadata 112, or external information 114), and/or the auxiliary information, and can map structured or unstructured information relating to the entities and the relationships to the desired common representation (e.g., a desired common structured format) to generate, for example, the entity relationship mapping 400 and/or other entity relationship mappings.

With regard to the example entity relationship mapping 400, based at least in part on the results of such analysis, the model component 202 and/or AI component 204 can determine that the entity 402 can have various relationships with other entities, including entity 404, entity 406, entity 408, and entity 410, and also can determine that the entity 402 does not have a relationship with certain other entities, such as entity 412. For instance, the entity 402 can have a relationship 414 with the entity 404, a relationship 416 with the entity 406, a relationship 418 with the entity 408, and a relationship 420 with the entity 410. Also, based at least in part on the results of such analysis (e.g., AI analysis using one or more AI techniques or algorithms, such as described herein), the model component 202 and/or AI component 204 can map structured or unstructured information relating to the entities (e.g., 404, 406, 408, and 410) and the relationships (e.g., 414, 416, 418, and 420) to the desired common representation to generate the entity relationship mapping 400. Based on such analysis results, and as part of the mapping and structuring of the respective entities and respective relationships to the desired common representation, the model component 202 and/or AI component 204 can determine (e.g., calculate) respective numerical values that can represent the entities (e.g., 404, 406, 408, and 410) and the respective relationships between entities (e.g., 414, 416, 418, and 420) in relation to each other. For example, in the entity relationship mapping 400, the entity 402 can be located at a particular point (x,y) on the mapping 400, and, in relation to the entity 402, the entity 404 can be located at (x+a,y+b), the entity 406 can be located at (x+c,y−d), the entity 408 can be located at (x+e,y−f), and the entity 410 can be located at (x−g,y−h), wherein x, y, a, b, c, d, e, f, g, and h can represent respective numerical values (e.g., respective real numbers). An entity that is relatively close in distance to (e.g., has a relatively shorter path to) the entity 402 can have a relatively stronger relationship to the entity 402 than an entity that is relatively further in distance away from (e.g., has a relatively longer path to) the entity 402. For instance, as can be observed in the entity relationship mapping 400, the entity 406 can have the strongest relationship (e.g., relationship 416) with the entity 402 because the entity 406 is closest to (e.g., has the shortest path to) the entity 402, the entity 404 also can have a relatively strong relationship (e.g., relationship 414) with the entity 402 because it is relatively close to the entity 402, although not as close as entity 406, and the entity 408 and entity 410 can have relatively weaker relationships (e.g., relationship 418, relationship 420) with the entity 402 because they are located further away from the entity 402 than entity 404 and entity 406.

Also, based on such analysis results, the model component 202 and/or AI component 204 can determine that the entity 412 does not have a relationship with the entity 402. For instance, if the entity 402 relates to a time-of-day value, and the model component 202 and/or AI component 204 determine that the entity 412 contains or is associated with a negative numerical value or an alphabetical textual string that does not represent a time value, and determines that there is no other type of relationship that can be between the entity 402 and entity 412 and the entity 412 does not provide any context to the entity 412, the model component 202 and/or AI component 204 can determine that the entity 412 does not have a relationship with the entity 402, because the entity 402 relates to a time-of-day value and a time-of-day value cannot have a negative numerical value and would not have an alphabetical textual string that does not represent a time value.

The model component 202 and/or AI component 204 can input the information relating to the entity relationship mapping 400, including the respective numerical values (e.g., the respective x,y coordinates) associated with the respective entities (e.g., 404, 406, 408, and 410), the respective relationships between the respective entities (e.g., 414, 416, 418, and 420), and/or other desired information (e.g., type of entity, type of relationship, or other contextual information) to the scoring model (e.g., the AI-based scoring model) for further analysis by the scoring model (e.g., by the AI component 204) to facilitate inferring or determining whether there is a relationship, such as an indirect relationship, between a pair of candidate entities associated with the entity 402, as more fully described herein, wherein the pair of candidate entities can comprise, for example, a concept, a word, a phrase, or a document.

It is to be appreciated and understood that, for reasons of brevity and clarity, the example entity relationship mapping 400 presented certain relationships between the entity 402 and other entities (e.g., 404, 406, 408, and 410) and from the perspective of the entity 402. However, there also may be other relationships between the entity 402 and various other entities (not shown in FIG. 4) or other relationships between the other entities (e.g., with each other).

Figure 5:
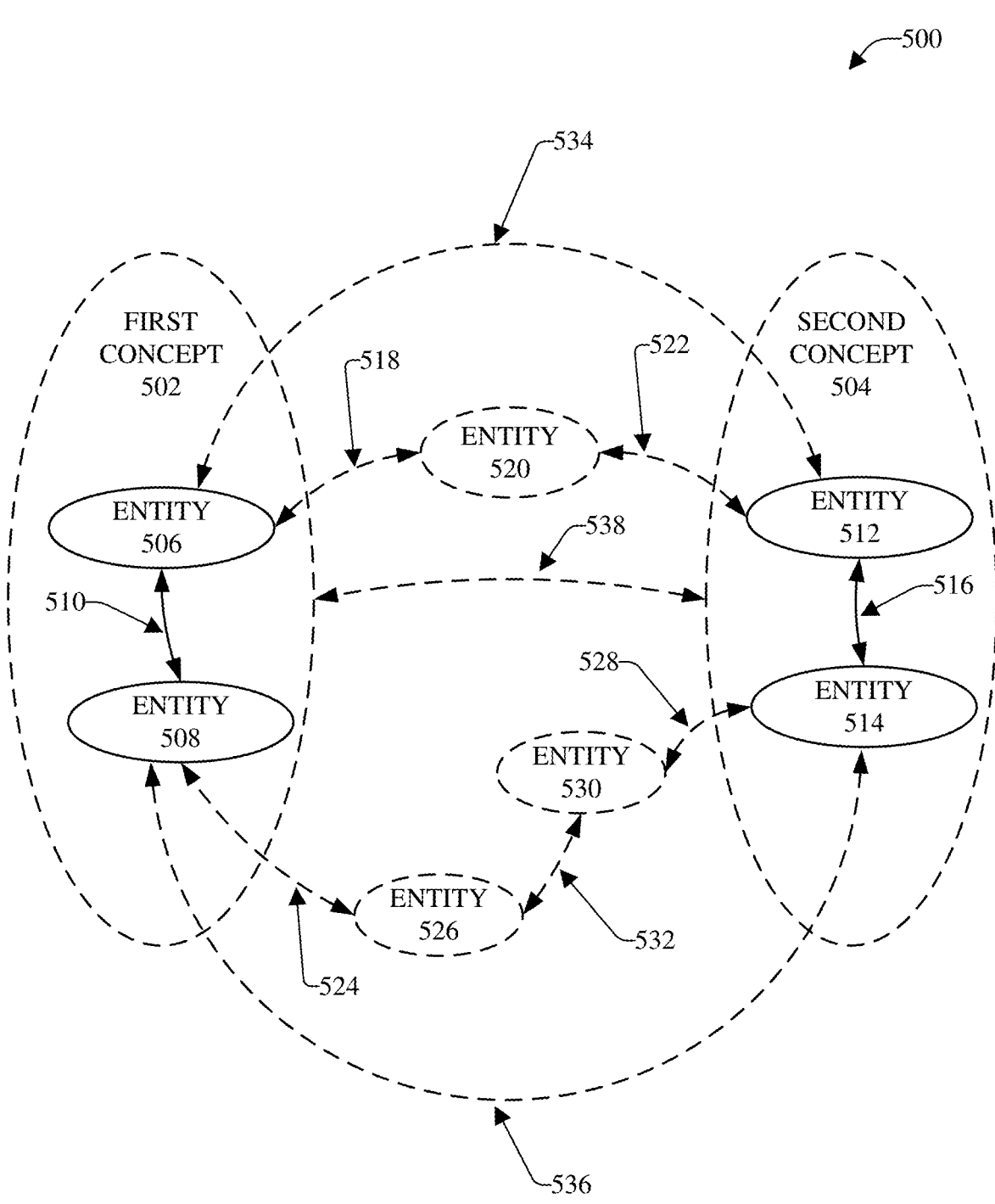
FIG. 5 illustrates a diagram of example, non-limiting entity relationships between entities that can indicate a relationship (e.g., an indirect relationship) between two concepts, in accordance with various aspects and embodiments of the disclosed subject matter.

Turning to FIG. 5 (along with FIGS. 1-3), FIG. 5 illustrates a diagram of example, non-limiting entity relationships 500 between entities that can indicate a relationship (e.g., an indirect relationship) between two concepts, in accordance with various aspects and embodiments of the disclosed subject matter. There can be a number of concepts (e.g., topics or subjects), including a first concept 502 and a second concept 504, associated with a group of electronic documents 104 and/or other information (e.g., data dictionaries 110, metadata 112, external information 114, and/or auxiliary information). Certain concepts, such as the first concept 502 and the second concept 504, can be disparate concepts with regard to which there is no direct and/or previously known relationship between the pair of concepts (e.g., first concept 502 and second concept 504).

The DMC 102 (e.g., employing the disclosed techniques, association inference model, and/or scoring model) can determine that the first concept 502 can comprise entity 506 (e.g., word, phrase, or document) and entity 508 (e.g., another word, phrase, or document) relating to the first concept 502, based at least in part on the results of analyzing the group of electronic documents 104 and/or the other information. In some embodiments, based at least in part on such analysis results, the DMC 102 can determine that the entity 506 can have a relationship 510 with the entity 508. Also, based at least in part on such analysis results, the DMC 102 can determine that the second concept 504 can comprise entity 512 and entity 514 relating to the second concept 504, and the entity 512 can have a relationship 516 with the entity 514.

In certain embodiments, based at least in part on the analysis results, including analysis of the association inference model and scoring model determined and generated from the analysis of the group of electronic documents 104 and/or the other information, the DMC 102 can determine or infer that the entity 506 associated with the first concept 502 has a relationship 518 with an entity 520, which is not directly related to the first concept 502, and the entity 512 associated with the second concept 504 has a relationship 522 with the entity 520, which is not directly related to the second concept 504. Additionally or alternatively, based at least in part on the analysis results, including the analysis of the association inference model and the scoring model, the DMC 102 can determine or infer that the entity 508 associated with the first concept 502 has a relationship 524 with an entity 526, the entity 514 associated with the second concept 504 has a relationship 528 with and entity 530, and the entity 526 has a relationship 532 with the entity 530, wherein the entity 526 is not directly related to the first concept 502 or the second concept 504, and wherein the entity 530 is not directly related to the first concept 502 or the second concept 504 either. Additionally or alternatively, based at least in part on the analysis results, including the analysis of the association inference model and the scoring model, the DMC 102 can determine or infer that the entity 506 associated with the first concept 502 has a relationship 534 (e.g., an indirect relationship) with the entity 512 associated with the second concept 504, and/or the entity 508 associated with the first concept 502 has a relationship 536 (e.g., an indirect relationship) with the entity 514 associated with the second concept 504 (e.g., irrespective of whether relationships 518, 522, 524, 528, and/or 532 are determined to exist).

In some embodiments, the DMC 102 (e.g., the model component 202 and/or AI component 204 of the DMC 102) can infer or determine one or more of the respective relationships (e.g., relationships 510, 516, 518, 522, 524, 528, 532, 534, and/or 536) between respective entities based at least in part on the results of an analysis of a first group of expanded keywords associated with the first concept 502, a second group of expanded keywords associated with the second concept 504, the group of electronic documents 104, and/or the other information. In certain embodiments, based at least in part on the analysis results, the DMC 102 (e.g., the model component 202 and/or AI component 204, employing the scoring model) can determine (e.g., calculate) respective entity-level (e.g., entity-to-entity) association scores relating to respective pairs of entities; and, based at least in part on the respective entity-level association scores and/or a defined threshold entity-level association score that can indicate whether there is a relationship between a pair of entities, the DMC 102 can infer or determine the respective relationships (e.g., relationships 510, 516, 518, 522, 524, 528, 532, 534, and/or 536) between the respective entities.

The DMC 102 (e.g., employing the model component 202, AI component 204, and/or evaluation component 208) also can determine a concept-level association score associated with the first concept 502 and second concept 504 (e.g., a pair of candidate concepts) as a function of one or more of the respective entity-level association scores associated with one or more pairs of the respective entities, as more fully described herein. The DMC 102 (e.g., employing the model component 202, AI component 204, and/or evaluation component 208) can determine whether the concept-level association score associated with the first concept 502 and second concept 504 satisfies (e.g., meets or exceeds; is greater than or equal to) a defined threshold (e.g., minimum threshold) concept-level association score that can indicate whether the first concept 502 is related to the second concept 504, in accordance with the defined data management criteria. In response to determining that the concept-level association score associated with the first concept 502 and second concept 504 satisfies the defined threshold concept-level association score, the DMC 102 (e.g., employing the model component 202, AI component 204, and/or evaluation component 208) can infer or determine that the first concept 502 has a relationship 538 (e.g., an indirect relationship) with the second concept 504, even though there was no direct and/or previously known relationship between the first concept 502 and second concept 504 (e.g., irrespective of whether relationships (e.g., edges) 518, 522, 524, 528, 532, 534, and/or 536 are determined to exist). If, instead, the DMC 102 had determined that the concept-level association score did not satisfy the defined threshold concept-level association score, the DMC 102 could have determined that no relationship was established between the first concept 502 and the second concept 504.

Figure 6:
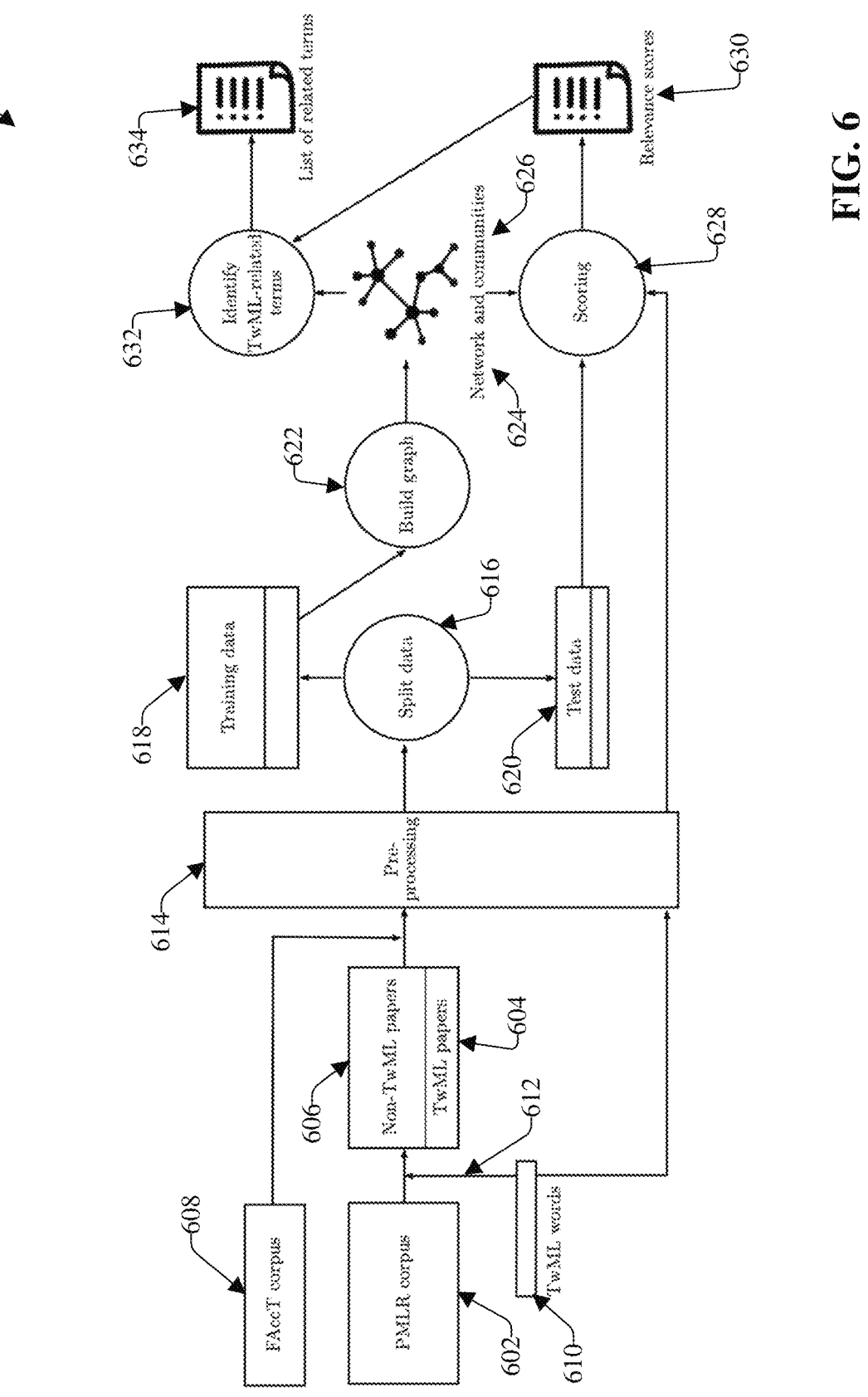
FIG. 6 depicts a diagram of an example data management process that can be used to infer, detect, and/or identify bias, fairness, and privacy issues in documents or other information in connection with artificial intelligence, including machine learning, in accordance with various aspects and embodiments of the disclosed subject matter.

Referring to FIG. 6 (along with FIGS. 1-3), FIG. 6 depicts a diagram of an example data management process 600 that can be used to infer, detect, and/or identify bias, fairness, and privacy issues in documents or other information in connection with AI, including ML, in accordance with various aspects and embodiments of the disclosed subject matter. The data management process 600 can be or comprise an example use of the disclosed subject matter, including the DMC 102 and associated models (e.g., association inference model and scoring model) and techniques, to facilitate inferring, detecting, and/or identifying bias, fairness, and privacy issues in documents (e.g., electronic documents 104) or other information in connection with AI, including ML.

There is an increasing interest in ensuring ML frameworks behave in a socially responsible manner and are deemed trustworthy. Although there has been some research in the field of trustworthy ML (TwML) in the recent past, much of the current characterization of such research has been qualitative. Consequently, decisions about how to address issues of trustworthiness and future research goals often can be left to the interested researcher. The disclosed subject matter, including the example data management process 600, present a desirable quantitative approach to characterizing the comprehension of TwML research. To this end, the disclosed subject matter, employing techniques of the DMC 102, built a co-occurrence network of words using a web-scraped corpus of more than 7,000 peer-reviewed ML papers published within the last five years. This corpus comprises papers both related and unrelated to TwML. As part of the data management process 600, the DMC 102 employed community detection to obtain semantic clusters of words in this network that can infer relative positions of TwML topics, as more fully described herein. The data management process 600 also employs a desirable fingerprinting algorithm that can obtain probabilistic similarity scores (e.g., association or relatedness scores) for individual words, and can combine the similarity scores to generate a paper-level (e.g., document-level) relevance score, as more fully described herein.

As part of the example data management process 600, a corpus of documents 602 (Proceedings of Machine Learning Research (PMLR) corpus), comprising 7107 documents, were obtained from an online website (PMLR website), with the documents (e.g., electronic documents 104) relating to ML research covering a breadth of topics that has been presented at various workshops and conferences. This corpus of documents as part of the analysis can ensure that there is a diverse dictionary of words and their co-occurrences.

Due to the wide scope of the document corpus 602, documents 604 (e.g., TwML documents) that specifically focus on TwML were grouped together with other documents 606 (e.g., non-TwML documents) that do not specifically focus on TwML. To create a distinctive set of documents that focus on TwML, the disclosed subject matter employed a two-pronged approach. First, another document corpus 608 (Fairness, Accounting, and Transparency (FAccT) corpus), comprising 221 documents, were obtained from a digital library, with the 221 documents being published in certain past conferences (FAccT conferences) over a multi-year period. Second, the disclosed subject matter (e.g., employing the DMC 102) searched, using a curated set of 74 words 610 (e.g., TwML words) and terms related to TwML, in the larger document corpus (e.g., the 7107 documents of the PMLR corpus) and labeled certain documents of the larger document corpus as TwML-focused when such documents were determined to contain at least one occurrence of such words in the set of 74 words (as indicated at reference numeral 612 of the data management process 600), as more fully described herein. This resulted in 263 more such documents relating to TwML.

As part of the data management process 600, the disclosed subject matter (e.g., employing the DMC 102) can perform pre-processing of the documents under consideration to remove or mitigate undesired noise in the data contained in the documents (as indicated at reference numeral 614 of the data management process 600). In a scientific paper, raw data, tables, plots, proofs, and references can all contribute to a noisy dictionary. Authors can spend considerable time deciding titles and writing abstracts to make them stand out more. Further, abstracts often can present a high-level summary of the research problem and methodology. Therefore, for the example analysis, the disclosed subject matter can restrict the corpus to only include, for example, titles, keywords (when present), and abstracts associated with the documents. The disclosed subject matter (e.g., the DMC 102) can perform desired pre-processing operations, including text pre-processing operations, such as, for example, converting text in the documents of the corpus under consideration to lowercase, removing special and numeric characters from the documents, tokenizing text strings in the documents, removing stop words and single character words from the text of the documents, and stemming words in the documents using a stemmer technique. After pre-processing of the information contained in the documents, the disclosed subject matter (e.g., the DMC 102) can utilize random sampling to split the corpus (as indicated at reference numeral 616 of the data management process 600), for example, assigning 90% of all of the documents (i.e., PMLR and FAccT documents) as a training set (e.g., training corpus) (as indicated at reference numeral 618 of the data management process 600) and the remainder (e.g., other 10%) of the documents as a test set (e.g., test corpus) (as indicated at reference numeral 620 of the data management process 600).

With the data of the documents divided into the training set and the test set, as part of the data management process 600, the disclosed subject matter (e.g., employing the DMC 102) can build (e.g., construct, create, or generate) a graph and a network of words and can detect communities of similar words (as indicated at reference numerals 622, 624, and 626 of the data management process 600), (2) fingerprint documents determined to be relevant to TwML, and (3) discover (e.g., determine or identify) non-TwML words that potentially can be relevant to the area of TwML, as more fully described herein.

With regard to building a network of words, the disclosed subject matter (e.g., the DMC 102), using the pre-processed abstracts from the documents of the training set 618, can build a word co-occurrence network 624 by connecting each pair of stemmed words that appear in the same abstract. The disclosed subject matter (e.g., the DMC 102) can represent connections between words (e.g., nodes or entities) with a weighted edge. The weight (e.g., weight having a desired weight value) can reflect co-occurrence, that is, can reflect or represent the number of times the pair of words appeared together, in an abstract of a document. This construction scheme generates an undirected, weighted network of words. The disclosed subject matter (e.g., the DMC 102) also can detect communities 626 in this network 624 and identify in which communities the predefined list of TwML words occur. In some embodiments, in order to more effectively perform community detection on the network, the disclosed subject matter (e.g., the DMC 102) can use additional data cleaning operations to denoise the graph 622 by removing very high-frequency words. In certain embodiments, the disclosed subject matter (e.g., the DMC 102) can apply a desired differential edge cutoff, such as removing the top 10% highest connectivity non-TwML words and the top 25% of highest connectivity TwML words that originate from splitting compound words (e.g., 'algorithmic bias'→'algorithm' and 'bias'). Note that this splitting of words also can convert the 74 TwML-specific words into 41 individual stemmed words. It is to be appreciated that, in other embodiments, other percentage values can be used for the differential edge cutoff(s). Finally, the disclosed subject matter (e.g., the DMC 102) can use the Louvain community detection algorithm to identify densely connected communities 626 within the above network 624.

The disclosed subject matter (e.g., the DMC 102) also can perform desirable bi-level fingerprinting, using a desired fingerprinting algorithm, to determine (e.g., calculate) probabilistic similarity scores (e.g., relatedness or relevance scores, or association scores) for individual words or papers (as indicated at reference numerals 628 and 630 of the data management process 600), wherein respective similarity scores can indicate respective similarities, relatedness, or associations between respective entities 106 (e.g., words, papers, or other entities). In some embodiments, the disclosed subject matter (e.g., the DMC 102) can determine a similarity score for each word individually based at least in part on its weighted shortest path distance from TwML words. In certain embodiments, the disclosed subject matter (e.g., the DMC 102) can utilize Dijkstra's algorithm to determine (e.g., calculate) the similarity score for each word individually based at least in part on its weighted shortest path distance from TwML words. In some embodiments, the disclosed subject matter (e.g., the DMC 102) can employ a desired algorithm that can be or can correspond to Algorithm 1, wherein Algorithm 1 can use pseudo-code to illustrate how the disclosed subject matter can achieve desirable (e.g., suitable or optimal) scoring of words.

Algorithm 1: Algorithm for word-level relevance scoring

```
procedure SCOREWORD(word, TwMLwords, Graph)
    if word in TwMLwords then
        return 1;
    else
        path = [ ];
        if word in Graph then
            for twml in TwMLwords do
                sp = weighted shortest path(word, twml);
                if sp != NULL then
                    path.append(sp);
        return path.mean( ) / path.max( )
```

The disclosed subject matter (e.g., the DMC 102) can determine (e.g., calculate) a relevance score ($s_{paper}$) for a full paper (e.g., electronic document 104) as the weighted average of the word-level (e.g., entity-level) scores of all words in that paper, assigning larger weights to words that belong to the same community as TwML words, for example, in accordance with (e.g., using) Equation (Eq.) (1) as follows:

$$s_{paper} = \frac{\sum_{k=1}^{N} s_i \left[ w_1 \times \mathbb{1}_{i \in TC} + w_2 \times \mathbb{1}_{i \in NTC} \right]}{\sum_{k=1}^{N} \left[ w_1 \times \mathbb{1}_{i \in TC} + w_2 \times \mathbb{1}_{i \in NTC} \right]} \qquad \text{Eq. 1}$$

wherein $s_i>0$ can be the relevance score of the $i^{th}$ word in the paper, and $w_1$ and $w_2$ can be weights with respective weight values. Given weights $w_1>w_2>0$, the disclosed subject matter (e.g., the DMC 102) can determine that the contribution of a word to the paper-level relevance score can be $w_1 s_i$, if the word belongs to any of the two communities rich in TwML words, which can be indicated by TwML community, or TC, and which can be as illustrated in Table 1, and can be $w_2 s_i$, if it belongs to any other community, which can be indicated by non-TwML community, or NTC. To determine a paper-level relevance score of a paper, the disclosed subject matter (e.g., the DMC 102) can consider the N words in the paper's abstract that yield non-zero scores through application of Algorithm 1 by the disclosed subject matter. With regard to Table 1, the TwML words can comprise stem or root portions of words that can relate to, for example, fairness, bias, privacy, sensitive or demographic characteristics of persons, or other similar or relevant types of words (e.g., "sensit" relates to sensitive, sensitivity, or other word that comprises sensit; "bias" relates to bias, biased, or other word that comprises bias; "discrimin" relates to discriminate, discrimination, or other word that comprises discrimin; "mitig" relates to mitigate, mitigation, or other word that comprises mitig). Finally, the denominator of Eq. (1) can normalize a paper-level relevance score by the maximum possible value, and the relevance score can be set to 0 if all word-level scores are 0 in a paper. In some embodiments, if the paper-level relevance score of a paper is >0.5, the disclosed subject matter (e.g., the DMC 102) can flag the paper as potentially TwML-related, although it is to be appreciated and understood that, in other embodiments, the threshold value for determining whether a paper can be flagged as potentially TwML-related can be greater than 0.5 or less than 0.5, as such threshold value is determined and set in accordance with the defined data management criteria. The disclosed subject matter (e.g., the DMC 102) can utilize a grid search to find desirable (e.g., suitable or optimal) values of the weights: $w_1=3$, $w_2=0.5$, although it is to be appreciated and understood that, in other embodiments, the weight value for $w_1$ can be greater than or less than 3, and the weight value for $w_2$ can be greater than or less than 0.5, as such weight values are determined and set in accordance with the defined data management criteria.

TABLE 1

| Community size | Number of TwML words | TwML words |
|---|---|---|
| | | TwML words in communities |
| 1127 | 26 | sensit, bias, decis, constraint, impact, group, remov, discrimin, attribut, demograph, fair, gender, implicit, interpret, mitig, pariti, treatment, unfair, criteria, dispar, sex, subgroup, transpar, crimin, racial, justic |
| 405 | 7 | differenti, mechan, privaci, privat, concern, individu, preserv |

TABLE 1-continued

| Community size | Number of TwML words | TwML words |
|---|---|---|
| | | TwML words in communities |
| 488 | 2 | metric, definit |
| 301 | 2 | account, procedur |
| 1228 | 1 | discoveri |
| 980 | 1 | trustworthi |
| 250 | 1 | hindsight |
| 748 | 1 | unbias |

Due to the nature of how the above paper-level relevance scores are calculated (e.g., using Eq. (1)), the probabilistic fingerprinting technique of the disclosed subject matter can be inherently and desirably interpretable. From analyzing the breakdown of a paper-level score of a paper (e.g., electronic document 104) into its constituent word-level scores, a user can obtain potential reasonings of why a paper may be (or may not be) highly relevant to TwML, as more fully described herein.

The disclosed subject matter (e.g., the DMC 102) also desirably can take into account the contextual similarity of non-TwML words to enhance (e.g., improve) determinations of relevance of entities, such as concepts, to each other. For instance, the disclosed subject matter (e.g., employing the DMC 102 and/or based on information received from a user(s)) can expand the existing (e.g., initial) list of TwML words (e.g., terms identified as TwML-related terms) with additional words (e.g., non-TwML words) that are determined (e.g., by the DMC 102 or user) to be conceptually related to TwML (as indicated at reference numerals 632 and 634 of the data management process 600). The reason for doing this can be two-fold. First, in the disclosed subject matter, the TwML words can be utilized as an initial seed list of primarily technical words that can be used for multiple purposes. However, expanding this existing or initial list of TwML words with additional contextually similar words, such as certain contextually similar non-TwML words, can result in a more inclusive set that can improve the fingerprinting process and determinations of relevance of entities to each other. Second, it can be desirable to identify broad areas of interest for future analysis or research using these conceptually similar words.

To this end, the disclosed subject matter (e.g., the DMC 102), by desirably expanding the initial list of TwML words to generate an expanded list of words that also can include certain non-TwML words, can utilize the connectivity information of certain non-TwML words with TwML words improve the fingerprinting process and determinations of relevance of entities to each other. The disclosed subject matter (e.g., the DMC 102) can extract all the direct connections of TwML words, along with their corresponding edge weights, which indicate the strength of their connection. In addition, the disclosed subject matter (e.g., the DMC 102) can determine (e.g., calculate) a relevance score for each direct neighbor word (e.g., each direct neighbor word (e.g., non-TwML word) of a TwML word) using, for example, Algorithm 1, Dijkstra's algorithm, or another desirable (e.g., suitable) algorithm, which can determine, identify, and/or provide information regarding the overall connectivity of that neighbor word with TwML words as a whole. Finally, the disclosed subject matter (e.g., the DMC 102) use defined threshold cutoff values on edge weights and word relevance scores (e.g., defined upper threshold cutoff edge weight value; defined upper threshold cutoff word relevance score) to identify words (e.g., neighbor words) above the application defined threshold cutoff value(s) as potentially of interest or relevance.

With further regard to the co-occurrence network 624 of words, the disclosed subject matter (e.g., the DMC 102) determined that only about 7% (e.g., 484 out of 7328) of all documents in the document corpus 602 and the document corpus 608 are TwML-related. Some studies have empirically observed that existing methods, such as knowledge graphs or high-dimensional numeric embeddings, can be less reliable for characterizing rare concepts or terms. Because of this rarity issue of TwML papers, as described herein, to enhance (e.g., improve, increase, or optimize) the reliability in characterizing concepts and terms in connection with TwML, the disclosed subject matter (e.g., the DMC 102) can use a word co-occurrence network 624 in place such existing methods. With regard to the document corpus 602 and the document corpus 608 (e.g., a total of 7328 documents), the resulting network 624 contains 10,698 nodes (e.g., entities 106) and 254,347 edges (e.g., relationships 108).

The disclosed subject matter (e.g., the DMC 102), employing, for example, the community detection algorithm, can generate 25 communities (e.g., communities 626), with a modularity score of 0.33. As given in Table 1, TwML-related words can be concentrated in two communities of the total group of communities 626. Among them, seven words that primarily can be related to differential privacy (DP) can be separate (e.g., separated by the DMC 102) from the rest of the group of communities 626 into one community (e.g., as shown in the second row in Table 1). Also, employing, for example, the community detection algorithm, the disclosed subject matter (e.g., the DMC 102) can determine or identify another community of 1127 words that contains 26 other TwML-specific words. For convenience, the disclosed subject matter can refer to these communities as DP community and non-DP community, respectively. With regard to the remaining 8 TwML words in Table 1, words which are mainly ambiguous terms, such as 'metric' or 'procedur' or general such as 'trustworthi', the disclosed subject matter (e.g., the DMC 102) can distribute those remaining TwML words across 6 communities, as presented in Table 1.

Referring to FIG. 7 (along with FIGS. 1-3 and 6), FIG. 7 presents a diagram of an example graph 700 that can visualize the overall co-occurrence network 624, including the communities 626, focusing on the two TwML-specific communities (e.g., the DP community and the non-DP community) of the group of communities 626, in accordance with various aspects and embodiments of the disclosed subject matter. The overall co-occurrence network 624 (e.g., network of the ML research space) depicted in the example graph 700 was constructed from the PMLR corpus 602 and FAccT corpus 608 using the techniques of the disclosed subject matter (e.g., the DMC 102). As depicted in the graph 700, the co-occurrence network 624 can comprise a plurality of nodes (e.g., entities 106), such as, for example, node 702, node 704, node 706, and node 708, wherein each node can represent a term associated with the PMLR corpus 602 or FAccT corpus 608, and wherein each edge (e.g., relationship 108 between entities) can represent the number of times a pair of words co-occur in an abstract of a paper (e.g., an electronic document 104). In the graph 700, the disclosed subject matter can highlight the two communities, a community 710 associated with a first type of community membership and a community 712 associated with a second type of community membership, of the group of communities 626 that contain the most TwML words (e.g., nodes). As can be observed in the graph 700, there can be some overlap between the community 710 and the community 712 in the graphical space of the graph 700, wherein TwML words can be highlighted separately per their respective subject area. The disclosed subject matter can categorize the TwML words (e.g., nodes) into four subject-based categories, comprising, for example:

Privacy: 'privaci', 'differenti', 'privat', 'guarantee', 'concern', 'preserv';

Interpretability: 'transpar', 'interpret', 'account';

General: 'trustworthi', 'mechan', 'algorithm', 'data'; and

Fairness: all other TwML words.

In the example graph 700, privacy-specific words 714 can be represented by a diamond shape, interpretability-specific words 716 can be represented by a square shape, general words 718 can be represented by a black circle shape, and fairness-specific words 720 can be represented by a star shape.

From the relative position of words in each category in the graph 700 of FIG. 7, it can be observed that a number of privacy-specific words 714 can cluster together (as depicted by reference numeral 722) and a number of fairness-specific words 720 (as depicted by reference numeral 724) can cluster together, and these two clusters 722 and 724 can be well-separated from each other in the graphical space of the graph 700.

With further regard to fingerprinting of papers, due in part to the probabilistic nature of the fingerprinting process of the disclosed subject matter, the disclosed subject matter (e.g., the DMC 102) can use the fingerprinting process to classify whether or not a paper (e.g., a paper of the PMLR corpus 602 or FAccT corpus 608) is related to TwML or is not related to TwML. Table 2 presents the results (e.g., as determined and generated by the disclosed subject matter (e.g., the DMC 102)) across different metrics and the two corpuses, the PMLR corpus 602 and the FAccT corpus 608.

TABLE 2

| Performance of paper-level fingerprinting | | | | |
|---|---|---|---|---|
| Corpus | AUC | Precision | Recall | F1 score |
| PMLR | 0.81 | 0.42 | 0.81 | 0.55 |
| FAccT | — | 1 | 0.88 | 0.94 |
| Overall | 0.82 | 0.47 | 0.82 | 0.6 |

In Table 2, AUC=Area Under Curve can use the respective paper-level probability relevance scores associated with the respective papers of the PMLR corpus 602 and the FAccT corpus 608, as determined using Eq. (1). For the other three metrics (e.g., Precision, Recall, and F1 Score), the disclosed subject matter can use a default threshold cutoff value of 0.5 on paper-level probability relevance scores.

As can be observed from Table 2, The techniques of the disclosed subject matter can exhibit relatively good recall values across the two corpuses, PMLR corpus 602 and FAccT corpus 608. The precision in the PMLR corpus 602, hence, the overall precision—as it forms a large proportion of the overall set of papers—can be relatively low (e.g., 0.42). This can be an indication that there are probably several papers in the PMLR corpus 602 that do not contain the pre-specified TwML words (e.g., the initial list of TwML words), but potentially may be related to this subject based on the contents of such papers. Note that, since all the papers in the FAccT corpus 608 are labeled as TwML-related, area under curve (AUC) does not exist for this category, and it can exhibit a perfect precision (e.g., 1).

TABLE 3

Top 25 papers with highest fingerprinting scores

| Index | Paper title | Score |
|---|---|---|
| 1 | Sparse Reinforcement Learning via Convex Optimization | 0.72 |
| 2 | Boosting with Online Binary Learners for the Multiclass Bandit Problem | 0.71 |
| 3 | Dirichlet Process Mixtures of Generalized Linear Models | 0.7 |
| 4 | Optimal δ-Correct Best-Arm Selection for Heavy-Tailed Distributions | 0.69 |
| 5 | Lifted Weight Learning of Markov Logic Networks Revisited | 0.7 |
| 6 | Efficient Computation of Updated Lower Expectations for Imprecise Continuous-Time Hidden Markov Chains | 0.64 |
| 7 | Enhanced statistical rankings via targeted data collection | 0.62 |
| 8 | Multi-Observation Elicitation | 0.6 |
| 9 | Spotlighting Anomalies using Frequent Patterns | 0.6 |
| 10 | Class Proportion Estimation with Application to Multiclass Anomaly Rejection | 0.57 |
| 11 | Exact Subspace Segmentation and Outlier Detection by Low-Rank Representation | 0.57 |
| 12 | Wasserstein Propagation for Semi-Supervised Learning | 0.56 |
| 13 | Multitask Principal Component Analysis | 0.56 |
| 14 | Risk-Aware Active Inverse Reinforcement Learning | 0.56 |
| 15 | Optimal Densification for Fast and Accurate Minwise Hashing | 0.55 |
| 16 | A Bayesian Approach for Inferring Local Causal Structure in Gene Regulatory Networks | 0.54 |
| 17 | Lifting high-dimensional non-linear models with Gaussian regressors | 0.52 |
| 18 | Qualitative Multi-Armed Bandits: A Quantile-Based Approach | 0.51 |
| 19 | Safe Policy Improvement with Baseline Bootstrapping | 0.51 |
| 20 | Cooperative Online Learning: Keeping your Neighbors Updated | 0.51 |
| 21 | Analysis of Empirical MAP and Empirical Partially Bayes: Can They be Alternatives to Variational Bayes? | 0.5 |
| 22 | Tree-Based Inference for Dirichlet Process Mixtures | 0.5 |
| 23 | Sequence Prediction Using Neural Network Classifiers | 0.5 |
| 24 | Variance Reduction for Faster Non-Convex Optimization | 0.5 |
| 25 | Stochastic Variance Reduction for Nonconvex Optimization | 0.5 |

Table 3 presents non-TwML papers from the PMLR corpus 602 with the highest paper-level relevance scores (e.g., fingerprinting scores) as compared to the other paper-level relevance scores of other non-TwML papers from the PMLR corpus 602. Referring briefly to FIG. 8 (along with FIGS. 1-3 and 6), FIG. 8 presents a diagram of example graphs 800 of word-level relevance scores for selected papers presented in Table 3, in accordance with various aspects and embodiments of the disclosed subject matter. A number of papers in Table 3 are on topics such as reinforcement learning, active learning, bandit algorithms, and outlier detection that have received relatively less attention in the TwML literature, as compared to some other papers. The graphs 800 of the word-level relevance scores for selected papers presented in FIG. 8 can bring in an aspect of the interpretability in the paper-level fingerprinting techniques employed by the disclosed subject matter (e.g., the DMC 102). As an example, as can be observed in the graphs 800, the graph 802 shows that paper 7 in Table 3 has a relatively high paper-level relevance score due in part to relevance score 804 of the word 'movi', which belongs to the DP community, and the relevance score 806 of the word 'fisher' which belongs to neither of the two TwML-word rich communities (e.g., the DP community and the non-DP community).

With further regard to contextual similarity, to expand the existing (e.g., initial) list of TwML words with additional conceptually related words to generate an expanded list of conceptually relevant words, the disclosed subject matter (e.g., employing the DMC 102) can use the edge weight and relevance score of each word that is a direct neighbor of a TwML word in the co-occurrence network 624 of words to identify or determine a desirable (e.g., appropriate, suitable, or optimal) threshold cutoff relevance score. The disclosed subject matter filtered for terms with an edge weight ≥100 and relevance score ≥0.5, wherein such filtering resulted in a subset of 290 words that satisfied the edge weight and relevance score criteria, and the subset of 290 words can be further assessed for their significance. Table 4 highlights 10 words (e.g., words, word stems, or roots of words) of the subset of 290 words.

TABLE 4

Contextually similar words to TwML

| Word | Weight | Score | Community | Word | Weight | Score | Community |
|---|---|---|---|---|---|---|---|
| race | 354 | 0.98 | Non-DP | physiolog | 252 | 0.81 | Others |
| drug | 324 | 0.88 | Others | censor | 180 | 0.78 | Non-DP |
| tamper | 324 | 0.88 | Non-DP | facial | 198 | 0.76 | Others |
| stereotyp | 318 | 0.87 | Non-DP | secur | 177 | 0.70 | Non-DP |
| membership | 222 | 0.82 | Non-DP | skin | 180 | 0.67 | Non-DP |

A number of interesting insights can come out from the above analysis. With regard to the co-occurrence network 624 of words, the differential distribution of TwML words within communities, as observed in Table 1, can indicate that TwML papers tend to focus more on certain lines of research, methods or applications than other types of papers. In the context of ML bias and fairness, this is echoed by certain existing literature where it has been observed that addressing group fairness in classification problems has received disproportionately high interest compared to other fairness categories (e.g., individual fairness, subgroup fairness) and types of methods (e.g., clustering, graph embedding). Within the TwML words, differential privacy (DP)-specific words and those related to fairness and transparency group separately into two different communities. A potential reason for this may be that DP is a comparatively older research area, and has seen more theoretical developments than relatively new topics like fairness or transparency.

As also can be observed, with regard to the paper-level fingerprinting, all of the papers in Table 3 with the relatively high relevance scores are on comparatively complex algorithms. A number of these areas have been heavily researched of late, such as reinforcement learning (RL) (papers 1, 14, and 19 in Table 3), bandit problems (papers 2, 4, and 18 in Table 3), anomaly detection (papers 2, 9, 10, and 11 in Table 3), representation learning (papers 11, 13, and 15 in Table 3), multitask problems (papers 2, 8, 10, and 13 in Table 3), dirichlet process (papers 3 and 22 in Table 3), and nonconvex optimization (papers 24 and 25 in Table 3).

The word-level breakdown of relevance scores in the graphs 800 of FIG. 8 can provide further insights into how the concepts in these papers may be related to TwML. Top word-level relevance scores for paper 7 (e.g., relevance score 804 associated with the word 'movi' in graph 802) and paper 19 (e.g., relevance score 808 associated with the term 'mdps' in graph 810) come from TwML-words that belong to the non-DP community. Looking into their subject matters, paper 7 studies statistical ranking for dependent network data, and paper 19 is on safe policy improvement in RL. Interestingly, a very recent paper that is not in the analyzed corpus (e.g., not in the PMLR corpus 602) has studied the problem of applying fairness constraints on node ranks in a graph. With regard to paper 19, safe policies in RL refer to policies that maximize expected return in problems where ensuring certain safety constraints is important alongside satisfactory performance. In the context of ML fairness, safe policies can potentially be policies that satisfy equitable performance guarantees for sensitive demographic subgroups.

TABLE 5

| Top 10 Words with highest scores in either of the TwML communities | | | | | |
| --- | --- | --- | --- | --- | --- |
| Word | Score | Community | Word | Score | Community |
| movi | 0.887 | Non-DP | vb | 0.729 | Non-DP |
| dp | 0.825 | DP | triplet | 0.646 | Non-DP |
| mdps | 0.825 | Non-DP | chi | 0.645 | DP |
| membership | 0.815 | Non-DP | ordinary | 0.627 | DP |
| multiclass | 0.755 | DP | opt | 0.604 | DP |

In Table 5, the disclosed subject matter summarizes the words with highest word-level relevance scores among words that occur in any of the 25 papers in Table 3, and belong to either the DP or non-DP community. Among words belonging to the DP community, 'multiclass' is interesting. After a small number of papers in the early 2010s, multiclass problems in DP have started to receive more attention recently. Words in the non-DP cluster, on the other hand, refer to methods or algorithms-'mdps' is Markov Decision Processes, 'vb' is variational Bayes, and 'triplet' is triplet loss. Each of these categories are contextual to ML fairness or explainability. For example, certain existing literature uses variational inference for incorporating causality and fairness notions in ML models. Other existing literature explains reward functions in MDPs by building a classification model with rewards as outputs. A recent preprint paper applies the triplet loss in the context of fairness.

With further regard to contextual similarity, a relatively large number of 'similar' words that can be heavily connected with TwML words do not pertain to algorithms or methods, and do not belong to the DP community. Table 4 presents ten such words. In contrast to words that can be highly significant to fingerprinting of papers (as presented in Table 5), these similar words mostly refer to application aspects of fairness (e.g., 'race', 'stereotyp', 'facial', 'skin'), privacy and security (e.g., 'tamper', 'membership', 'secur'), as well as other practical issues (e.g., 'drug', 'physiolog', 'censor'). This potentially can suggest two things. First, application-oriented keywords may be closely associated with TwML terms, and should be used, or at least considered for use, to characterize the research landscape of this interdisciplinary field. Second, such application areas may foster new connections with TwML topics, especially the topics with which each such word relates.

With further regard to FIGS. 1 and 2, in accordance with various embodiments, the disclosed subject matter, employing the DMC 102 and its constituent or associated components, and/or associated applications, can perform multiple (e.g., two or more) operations relating to analysis of electronic documents, tables, or databases, charts, web pages, or other information, extraction of information from tables, or databases, charts, web pages, or other information, embedding of entities and relationships between entities, creation or updating of models (e.g., association inference model, scoring model), inferring or predicting of relationships between entities, including relationships between concepts, evaluation of candidate entities (e.g., candidate words, phrases, documents, or concepts), and/or other operations, in parallel, concurrently, and/or simultaneously, as desired.

With further regard to the communication device (e.g., communication device 116), a communication device also can be referred to as, for example, a device, a mobile device, or a mobile communication device. The term "communication device" can be interchangeable with (or include) user equipment (UE) or other terminology. A communication device (or UE or device) can refer to any type of wireless device that can communicate with a radio network node in a cellular or mobile communication system of a communication network, or can refer to any device that can be connected to a communication network via a wireline communication connection. Examples of communication devices can include, but are not limited to, a cellular and/or smart phone, a mobile terminal, a scanner or multi-purpose printer/scanner device, a computer (e.g., a laptop embedded equipment (LEE), a laptop mounted equipment (LME), or other type of computer), a device to device (D2D) UE, a machine type UE or a UE capable of machine to machine (M2M) communication, a Personal Digital Assistant (PDA), a tablet or pad (e.g., an electronic tablet or pad), a smart meter (e.g., a smart utility meter), an electronic gaming device, electronic eyeglasses, headwear, or bodywear (e.g., electronic eyeglasses, headwear, or bodywear having wireless communication functionality), an appliance (e.g., a toaster, a coffee maker, a refrigerator, or an oven having wireless communication functionality), a device associated or integrated with a vehicle (e.g., automobile, airplane, bus, train, or ship), a drone having wireless communication functionality, a home or building automation device (e.g., security device, climate control device, lighting control device), an industrial or manufacturing related device, and/or any other type of communication devices (e.g., other types of Internet of Things (IoTs)).

The AI component 204 can employ artificial intelligence techniques and algorithms, machine learning techniques and algorithms, and/or graph mining to facilitate determining and generating graphs relating to relationships 108 between entities 106, determining and generating a scoring model (e.g., association, relatedness, relevance, or similarity scoring model), determining scores (e.g., association, relatedness, relevance, or similarity scores, including word-level scores, document-level scores, and concept-level scores) relating to candidate relationships between entities (e.g., words, phrases, documents, or concepts), inferring or determining relationships 108 between entities, identifying and managing bias, fairness, transparency, privacy, and/or other characteristics associated with electronic documents 104 and other information, and/or automating one or more functions or features of the disclosed subject matter, as more fully described herein.

With further regard to the AI component 204, the AI component 204 can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 204 can examine the entirety or a subset of the data (e.g., data in electronic documents 104, datasets, such as datasets stored in tables or databases, data in data dictionaries 110, metadata 112, external information 114, or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 9:
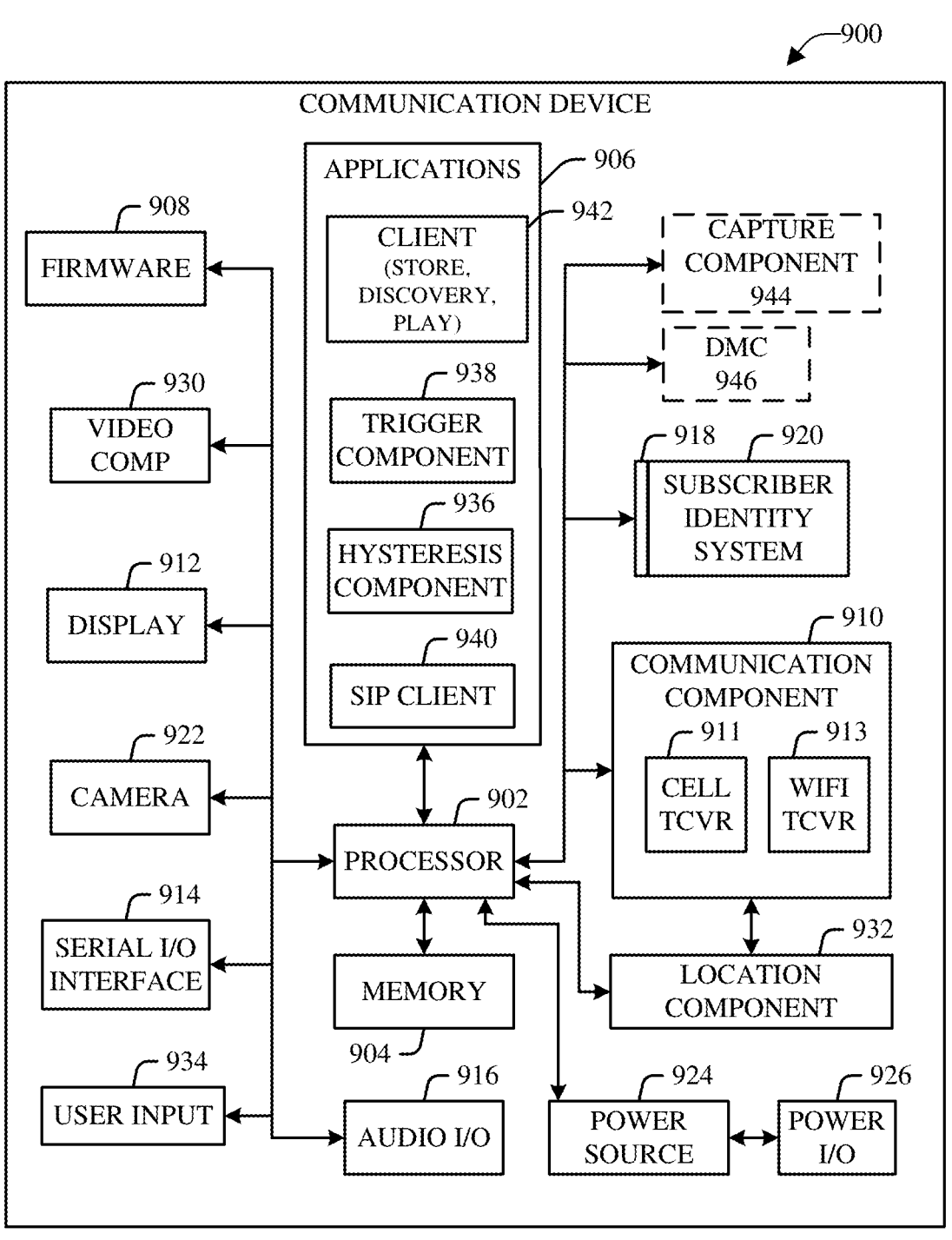
FIG. 9 depicts an example block diagram of an example communication device operable to engage in a system architecture that facilitates wireless communications according to one or more embodiments described herein.

Referring now to FIG. 9, FIG. 9 depicts an example block diagram of an example communication device 900 (e.g., wireless or mobile phone, electronic pad or tablet, or IoT device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software. Also, while, in some embodiments, the communication device 900 can be a wireless communication device, in other embodiments of the disclosed subject matter, a communication device can communicate via a wireline communication connection with a communication network.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 900 can include a processor 902 for controlling and processing all onboard operations and functions. A memory 904 interfaces to the processor 902 for storage of data and one or more applications 906 (e.g., a video player software, user feedback component software, or other application). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the communication device 900. A communication component 910 interfaces to the processor 902 to facilitate wired/ wireless communication with external systems, e.g., cellular networks, VoIP networks, and so on. Here, the communication component 910 can also include a suitable cellular transceiver 911 (e.g., a GSM transceiver) and/or an unlicensed transceiver 913 (e.g., Wi-Fi, WiMax) for corresponding signal communications. The communication device 900 can be a device such as a cellular telephone, a PDA with mobile communications capabilities, and messaging-centric devices. The communication component 910 also facilitates communications reception from terrestrial radio networks (e.g., broadcast), digital satellite radio networks, and Internet-based radio services networks.

The communication device 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The communication device 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the communication device 900, and updated by downloading data and software.

The communication device 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the communication device 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The communication device 900 also includes a power source 924 in the form of batteries and/or an AC power subsystem, which power source 924 can interface to an external power system or charging equipment (not shown) by a power I/O component 926.

The communication device 900 can also include a video component 930 for processing video content received and, for recording and transmitting video content. For example, the video component 930 can facilitate the generation, editing and sharing of video quotes. A location tracking component 932 facilitates geographically locating the communication device 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the communication device 900 to support SIP protocols and register the subscriber with the SIP registrar server. The applications 906 can also include a client 942 that provides at least the capability of discovery, play and store of multimedia content, for example, music.

The communication device 900, as indicated above related to the communication component 910, includes an indoor network radio transceiver 913 (e.g., Wi-Fi transceiver). This function supports the indoor radio link, such as IEEE 802.11, for the dual-mode GSM device (e.g., communication device 900). The communication device 900 can accommodate at least satellite radio services through a device (e.g., handset device) that can combine wireless voice and digital radio chipsets into a single device (e.g., single handheld device).

In some embodiments, the communication device 900 optionally can comprise a capture component 944 that can comprise or employ a camera or scanner to capture or scan physical documents or images, including physical documents or images that can comprise tables, databases, freeform text, or other information, as more fully described herein. For example, the capture component 944 can capture (e.g., capture an image of) a physical document comprising a table that contains a group of cells or fields that comprise items of data, as more fully described herein.

In certain embodiments, the communication device 900 optionally can comprise a DMC 946 that can perform various operations relating to analysis of electronic documents, tables, or databases, or other datasets, extraction of information from electronic documents, tables, or databases, or other datasets, embedding of entities and relationships between entities, creation or updating of models (e.g., association inference model, scoring model), inference, determination, or prediction of relationships between entities (e.g., words, phrases, concepts, or documents), character recognition, evaluation of candidate pairs of entities (e.g., to determine whether a relationship exists between the candidate pairs of entities), and/or other operations, in accordance with the data management criteria, as more fully described herein.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 11:
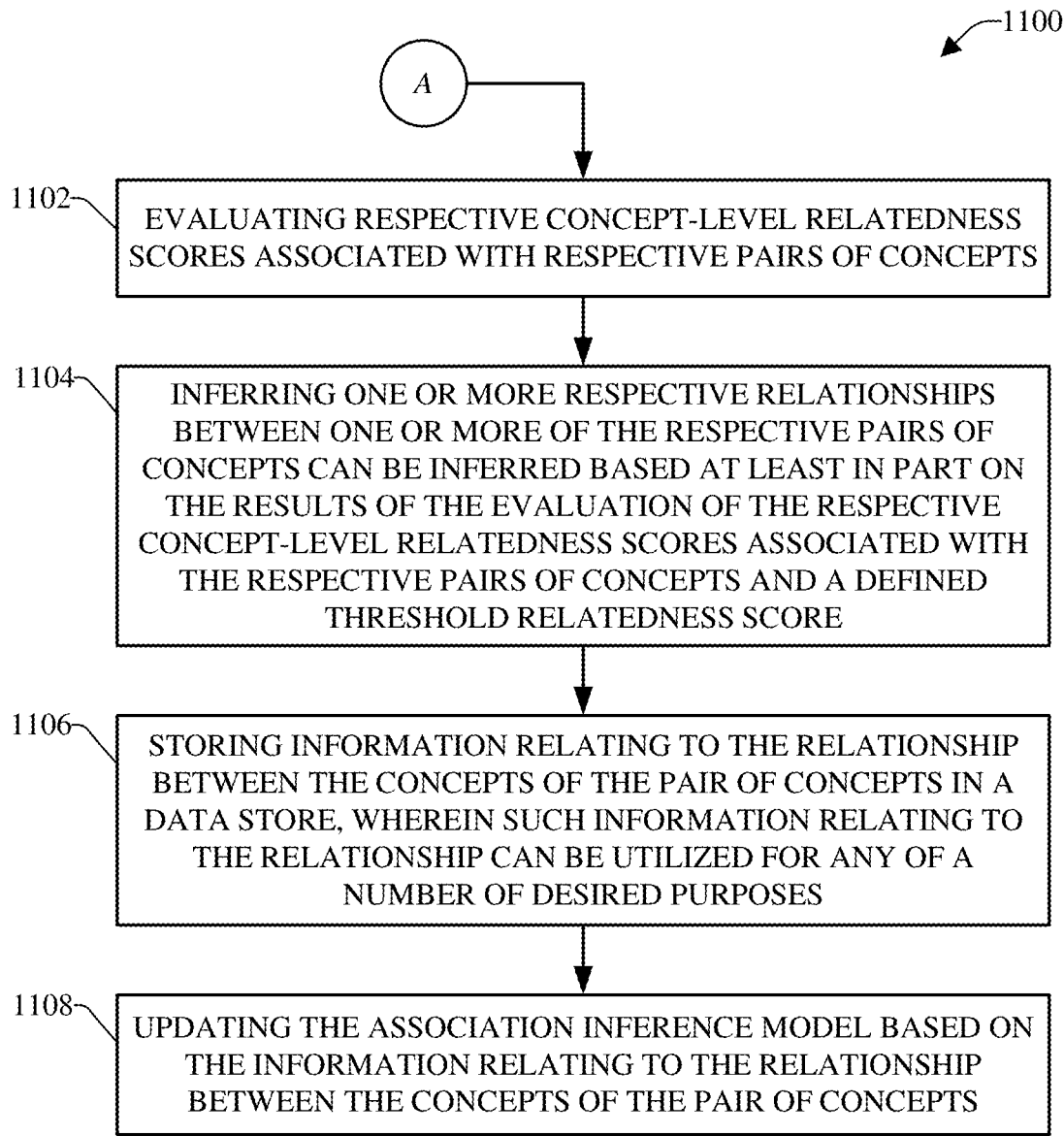
FIG. 11 depicts a flow diagram of an example, non-limiting method that can evaluate information relating to respective concepts to infer or determine respective relationships between respective pairs of concepts, in accordance with various aspects and embodiments of the disclosed subject matter.

In view of the example systems and/or devices described herein, example methods that can be implemented in accordance with the disclosed subject matter can be further appreciated with reference to flowchart in FIGS. 10-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow diagram of an example, non-limiting method 1000 that can desirably (e.g., accurately and efficiently) infer or determine a relationship (e.g., an indirect or second order relationship) between two concepts (e.g., associated with disparate areas or domains of interest), in accordance with various aspects and embodiments of the disclosed subject matter. The method 1000 can be implemented by a system that can comprise a DMC, a processor component, a data store, and/or another component(s). Alternatively, or additionally, a machine-readable medium can comprise executable instructions that, when executed by a processor, facilitate performance of the operations of the method 1000.

At 1002, information relating to a group of entities, respective relationships between respective entities of the group of entities, and a group of concepts associated with a group of electronic documents can be extracted from the group of electronic documents and entity-related information relating to the group of entities in a desired structured format, based at least in part on an analysis of the group of electronic documents and the entity-related information. At 1004, an association inference model can be determined based at least in part on the information relating to the group of entities, the respective relationships between the respective entities, and the group of concepts extracted in the desired structured format. The DMC can analyze the group of electronic documents and/or the entity-related information. The entity-related information can comprise, for example, data dictionaries or metadata associated with tables or databases, and/or external information (e.g., data dictionaries, metadata, grouping of terms into concepts, respective initial sets of keywords relating to respective concepts, respective expanded sets of keywords relating to the respective concepts, domain-specific information, respective concept descriptions of the respective concepts, and/or other external information), such as more fully described herein. Based at least in part on the results of the analysis, the DMC, employing an information inference model, can extract information relating to the respective entities of the group of entities, the respective relationships between the respective entities, and respective concepts of the group of concepts from the group of electronic documents and/or the entity-related information. The DMC can incorporate the extracted information into the association inference model in the desired structured format.

At 1006, the respective entities, the respective relationships between the respective entities, and/or the respective concepts of the group of concepts can be embedded in a common representation to create a scoring model that can be trained to be representative of the respective entities, the respective relationships between the respective entities, and/or the respective concepts, based at least in part on the results of an analysis of association inference model information of the association inference model in the desired structured format and/or other information. The DMC can embed the respective entities, the respective relationships between the respective entities, and/or the respective concepts in the scoring model (e.g., association, relatedness, relevance, or similarity scoring model) in the common representation (e.g., a desired common structured format), based at least in part on the results of the analysis of the association inference model information of the association inference model in the desired structured format and/or the other information (e.g., auxiliary information, such as entity weights and/or relationship weights, other metadata relating to the entities or relationships, version information regarding the model, or other auxiliary information). The association inference model information can comprise and/or can be based at least in part on information relating to the entities, the respective relationships between the respective entities, and/or the respective concepts. In some embodiments, the DMC can employ the AI component to perform an AI analysis and/or graph mining on the association inference model information of the association inference model, and can create the scoring model (e.g., a trained AI-based scoring model) based at least in part on the results of the AI analysis and/or graph mining, as more fully described herein.

At 1008, candidate entities for scoring can be determined based at least in part on the results of an analysis of the concepts associated with the scoring model and/or external information. At 1010, respective entity-level relatedness scores associated with respective pairs of candidate entities can be determined based at least in part on the results of the analysis of the scoring model and/or the external information. The DMC can determine the candidate entities for scoring based at least in part on the analysis of information relating to the concepts associated with the scoring model and/or external information. The information relating to the concepts can comprise, for example, respective initial sets of keywords associated with the respective concepts, the respective entities associated with the respective concepts, and/or the respective relationships between the respective entities. The external information can comprise, for example, respective expanded sets of keywords associated with the respective concepts. The DMC can determine (e.g., calculate or infer) the respective entity-level relatedness scores associated with the respective pairs of candidate entities based at least in part on the results of the analysis of the scoring model and/or the external information. A relatedness score between a pair of candidate entities can relate to or can be a measure of a level of relatedness, connectedness, or similarity between the candidate entities of the pair.

At 1012, respective concept-level relatedness scores associated with respective pairs of concepts can be determined based at least in part on the respective entity-level relatedness scores associated with the respective pairs of candidate entities that are associated with the respective concepts. The DMC can aggregate respective entity-level relatedness scores associated with respective candidate entities that are associated with the respective concepts, and can determine (e.g., calculate or infer) respective concept-level relatedness scores associated with respective pairs of concepts based at least in part on (e.g., as a function of) the respective entity-level relatedness scores associated with the respective candidate entities, as more fully described herein.

At 1014, the respective concept-level relatedness scores and/or the respective entity-level concept scores can be presented for evaluation. The DMC can present the respective concept-level relatedness scores and/or the respective entity-level concept scores for evaluation by the DMC or one or more users (e.g., via a communication device(s) and/or an interface(s) associated with the one or more users).

At this point, the method 1000 can proceed to reference point A, wherein, in accordance with various embodiments, the method 1100 can proceed from reference point A to evaluate information relating to respective concepts to infer or determine respective relationships between respective pairs of concepts.

FIG. 11 depicts a flow diagram of an example, non-limiting method 1100 that can evaluate information relating to respective concepts to infer or determine respective relationships between respective pairs of concepts, in accordance with various aspects and embodiments of the disclosed subject matter. The method 1100 can be implemented by a system that can comprise a DMC, a processor component, a data store, and/or another component(s). Alternatively, or additionally, a machine-readable medium can comprise executable instructions that, when executed by a processor, facilitate performance of the operations of the method 1100. In accordance with various embodiments, the method 1100 can proceed from reference point A to evaluate information relating to respective concepts to infer or determine respective relationships between respective pairs of concepts.

At 1102, respective concept-level relatedness scores associated with respective pairs of concepts can be evaluated. At 1104, one or more respective relationships between one or more of the respective pairs of concepts can be inferred based at least in part on the results of the evaluation of the respective concept-level relatedness scores associated with the respective pairs of concepts and a defined threshold relatedness score.

The DMC can evaluate the respective concept-level relatedness scores associated with the respective pairs of concepts in relation to (e.g., as compared against) the defined threshold relatedness score, wherein the defined threshold relatedness score can be determined or set in accordance with the defined data management criteria. For each concept-level relatedness score associated with a pair of concepts of the group of concepts, the DMC can determine whether the concept-level relatedness score associated with the pair of concepts satisfies (e.g., meets or exceeds; is at or greater than) the defined threshold relatedness score based at least in part on the results of the evaluation of the concept-level relatedness score associated with the pair of concepts and the defined threshold relatedness score. If the DMC determines that the concept-level relatedness score associated with the pair of concepts satisfies the defined threshold relatedness score, the DMC can infer or determine that there is a relationship between the concepts of the pair of concepts. In some embodiments, the relationship between such concepts can be an indirect or second order relationship between such concepts, wherein such indirect or second order relationship can exist even where respective underlying entities associated with the respective concepts of the pair of concepts do not have a relationship with each other (e.g., do not share an edge with each other).

In certain embodiments, the DMC can present (e.g., communicate and/or display) the respective concept-level relatedness scores associated with the respective pairs of concepts to a user (e.g., via a communication device and/or interface associated with the user) for evaluation by the user. For each concept-level relatedness score associated with a pair of concepts of the group or concepts, the user can evaluate the respective concept-level relatedness score associated with the pair of concepts (e.g., in relation to the defined threshold relatedness score), and based at least in part on the results of such evaluation, the user can infer or determine whether there is a relationship between the concept of the pair of concepts. If the user infers or determines that there is a relationship between the concepts of the pair of concepts, the user (e.g., via the communication device and/or interface) can communicate relationship information, which can indicate there is a relationship between the concepts of the pair of concepts, to the DMC.

At 1106, information relating to the relationship between the concepts of the pair of concepts can be stored in a data store, wherein such information relating to the relationship can be utilized for any of a number of desired purposes, such as more fully described herein. At 1108, the association inference model can be updated based at least in part on the information relating to the relationship between the concepts of the pair of concepts. For each relationship between concepts determined by the DMC (or a user), the DMC can store the information relating to the relationship between the concepts of the pair of concepts in the data store. Such information relating to the relationship can comprise information indicating or specifying the relationship between the concepts of the pair of concepts, the concept-level relatedness score associated with the pair of concepts, information relating to the respective concepts of the pair (e.g., concept description information), information relating to the respective organizations or departments associated with the respective entities, information indicating what type(s) of related-less between the concepts of the pair led to the relatively higher concept-level relatedness score, and/or other desired information relating to the relationship. In some embodiments, with regard to each relationship between concepts determined by the DMC (or a user), the DMC can (e.g., optionally can) update (e.g., modify) the association inference model, based at least in part on the information relating to the relationship between the concepts of the pair of concepts, which can enhance (e.g., improve) future inferences or determinations regarding whether there is a relationship (e.g., a first-level or direct relationship, or a second-level or indirect relationship) between concepts of a pair of concepts. As part of version control, the DMC can maintain (e.g., continue to store) information relating to one or previous versions of the association inference model in the data store, in addition to storing the updated current version of the association inference model in the data store.

Figure 12:
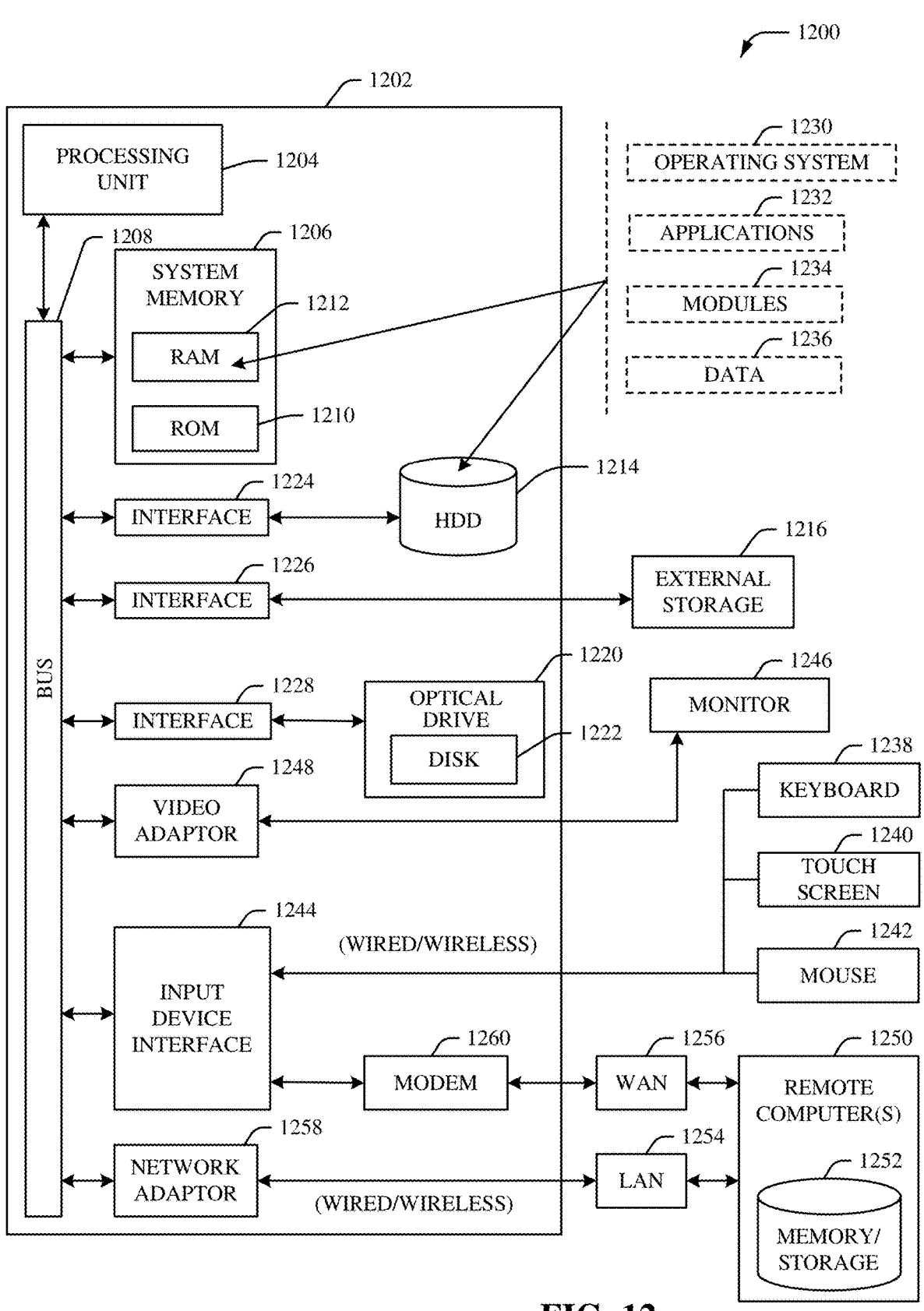
FIG. 12 illustrates an example block diagram of an example computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "entity," and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise performing cell identification to identify candidate cells that can be associated with a table of a document, performing a character recognition analysis on information relating to a document, performing cell relationship identification to identify relationships between candidate cells, determining cell placement of candidate cells in a table, extracting or recreating a table of a document, transmitting or receiving data, establishing a connection between devices, determining intermediate results toward obtaining a result, or other actions. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, the DMC, model component, association inference model, scoring model, AI component, weight component, evaluation component, ranking component, version control component, alert component, operations manager component, processor component, data store, communication device, sensors, antennae, audio and/or visual output devices, or other devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

maintaining, by a system comprising a processor, in a data storage, a data source storing electronic documents, and metadata and data dictionaries relating to the electronic documents, wherein the data source comprises structured information and unstructured information;

receiving, by the system, information from the data source and an external data source;

receiving, by the system, information relating to a particular domain, resulting in a domain knowledge constraint relating to the particular domain;

generating, by the system, an association inference model, to extract information regarding a group of entities, respective relationships between respective entities of the group of entities, and a group of topics based on an analysis of the received information, and construct a graph representation of the group of entities as nodes, and respective relationships between respective entities as edges associated with the group of topics;

generating, by the system, a scoring model implemented with an artificial intelligence (AI) model, by embedding the respective entities, the respective relationships between entities and the group of topics to a desired common representation to map structured or unstructured information relating to the group of entities, the respective relationships, and the topics to the desired common representation, thereby generating an entity relationship topic mapping, wherein the scoring model is further configured to be trained to quantify a strength of the respective relationships between entities in the graph representation using graph mining techniques including Dijkstra's algorithm;

in the graph representation, determining, by the system, using the scoring model, a first previously unknown relationship between a first entity associated with a first topic and a second entity not associated with the first topic or a second topic, wherein the first previously unknown relationship is determined based on a first shortest path, using Dijkstra's algorithm, in the graph representation connecting the first entity and the second entity and satisfies a defined relationship strength threshold, and wherein the first topic and the second topic respectively correspond to different domains and are subject to different domain knowledge constraints;

in the graph representation, determining, by the system, using the scoring model, a second previously unknown relationship between the second entity and a third entity associated with the second topic, wherein the second previously unknown relationship is determined based on a second shortest path, using Dijkstra's algorithm, in the graph representation connecting the second entity and the third entity and satisfies the defined relationship strength threshold; and outputting, by the system, information indicating the first previously unknown relationship and the second previously unknown relationship for presentation via a user interface, wherein the output is generated in response to quantified strengths exceeding the defined relationship strength threshold;

utilizing, by the system, information indicating the first previously unknown relationship and the second previously unknown relationship to identify problematic content, supplement lack of information, and determine cross-domain resource allocation in the stored electronic documents;

wherein the scoring model further comprises an artificial intelligence (AI) bias-related scoring model, wherein the AI bias-related scoring model is trained to receive as input data in the desired common representation and output an indication of bias in the group of electronic documents, wherein the indication of bias in the group of electronic documents is determined by:

expanding the information regarding the group of entities to additionally include a set of keywords associated with the bias, generating an association score between the set of keywords associated with the bias and two or more different topics, comparing the association score to a threshold value; and in response to the determining the association score is above a threshold value, removing, by the system, a portion of the group of electronic documents associated with the indication of bias in the group of electronic documents; and communicating by the system, to a user device for presentation at the user device, information indicating the first previously unknown relationship and the second previously unknown relationship.

2. The method of claim 1, further comprising:

based on the first previously unknown relationship between the first topic and the second topic:

allocating, by the system, resources associated with an organization identity or a first user identity; or communicating, by the system, topic information relating to the first topic to a device associated with a second user identity that is associated with the second topic.

3. The method of claim 1, wherein, prior to the determination of the first previously unknown relationship between the first topic and the second topic, no relationship between the first topic and the second topic had been identified by the system.

4. The method of claim 1, further comprising:

performing, by the system, an artificial intelligence analysis of association inference model information regarding the association inference model, wherein the association inference model information comprises the information regarding the group of entities, the respective relationships between the respective entities, and the group of topics, and wherein the generating of the scoring model comprises determining the scoring model based on a result of the artificial intelligence analysis.

5. The method of claim 1, wherein the information regarding the group of entities comprises a group of keywords relating to the group of topics, data dictionary information, metadata, domain knowledge information relating to a type of domain, grouping information relating to grouping of entities, organization-related terminology, or unstructured textual information relating to some of the respective entities of the group of entities.

6. The method of claim 5, wherein the group of electronic documents is a first group of electronic documents, wherein the group of keywords comprises an initial group of keywords relating to the first topic, wherein the initial group of keywords is expanded to form an expanded group of keywords relating to the first topic comprising additional keywords relating to the first topic determined from the first group of electronic documents or a second group of electronic documents based on the additional keywords being determined to satisfy a defined word frequency criterion, and wherein the additional keywords are not part of the initial group of keywords.

7. The method of claim 1, wherein the group of entities comprises a first subgroup of entities and a second subgroup of entities, wherein the first topic is associated with the first subgroup of entities and a first group of keywords, and wherein the second topic is associated with the second subgroup of entities and a second group of keywords.

8. The method of claim 1, further comprising:

determining, by the system, respective relationship strength scores associated with respective pairs of the respective entities based on the scoring model.

9. The method of claim 8, further comprising:

assigning, by the system, respective weight values to the respective entities or the respective relationships between the respective entities based on respective entity types of the respective entities or based on respective strengths of the respective relationships.

10. The method of claim 8, further comprising:

communicating, by the system, to a device associated with a user identity, a respective relationship strength score associated with a pair of topics;

receiving, by the system, evaluation information from the device, wherein the evaluation information indicates whether a relationship exists between the pair of topics; and based on the evaluation information, determining, by the system, whether the relationship exists between the pair of topics.

11. The method of claim 1, further comprising:

communicating, by the system, feedback information relating to a result of an evaluation of respective topic-level similarity scores associated with respective pairs of topics;

updating, by the system, the association inference model, based on the result of the evaluation, to generate an updated association inference model; and storing, by the system, the updated association inference model in a data store, wherein the association inference model is stored in the data store and is retained in the data store as a previous association inference model version.

12. The method of claim 1, further comprising:

receiving, by the system, the group of electronic documents from a group of data sources.

13. The method of claim 1, further comprising: in response to the determining the association score is above a threshold value, editing, by the system, a portion of the group of electronic documents associated with the indication of bias in the group of electronic documents.

14. A system, comprising:

a processor; and a memory that stores executable instructions that, when executed by the processor, facilitate performance of operations, comprising:

maintaining a data source, in a data storage, storing electronic documents, and metadata and data dictionaries relating to the electronic documents, wherein the data source comprises structured information and unstructured information;

receiving information from the data source and an external data source;

receiving information relating to a particular domain, resulting in a domain knowledge constraint relating to the particular domain;

generating an association model to extract the information relating to a group of entities, respective relationships between respective entities of the group of entities, and the group of topics based on an analysis of the received information and construct a graph representation of the group of entities as nodes, and respective relationships between respective entities as edges associated with the group of topics;

generating a scoring model, by embedding the respective entities, the respective relationships between the respective entities, and the group of topics to a desired common representation to map structured or unstructured information relating to the group of entities, the respective relationships, and the topics to the desired common representation, thereby generating an entity relationship topic mapping, based on association model information relating to the association model, wherein the scoring model comprises an artificial intelligence (AI) bias-related scoring model and is further configured to be trained to quantify a strength of the respective relationships between entities in the graph representation using graph mining techniques including Dijkstra's algorithm;

in the graph representation, determining, using the scoring model, a first previously unknown relationship between a first entity associated with a first topic and a second entity not associated with the first topic or a second topic, wherein the first previously unknown relationship is determined based on a first shortest path, using Dijkstra's algorithm, in the graph representation connecting the first entity and the second entity and satisfies a defined relationship strength threshold, and wherein the first topic and the second topic respectively correspond to different domains and are subject to different domain knowledge constraints;

in the graph representation, determining using the scoring model, a second previously unknown relationship between the second entity and a third entity associated with the second topic, wherein the second previously unknown relationship is determined based on a second shortest path, using Dijkstra's algorithm, in the graph representation connecting the second entity and the third entity and satisfies the defined relationship strength threshold; and in the graph representation, outputting information indicating the first previously unknown relationship and the second previously unknown relationship for presentation via a user interface, wherein the output is generated in response to quantified strengths exceeding the defined relationship strength threshold;

outputting information indicating the first previously unknown relationship and the second previously unknown relationship for presentation via a user interface, wherein the output is generated in response to the quantified strengths exceeding the defined relationship strength threshold;

utilizing information indicating the first previously unknown relationship and the second previously unknown relationship to identify problematic content, supplement lack of information, and determine cross-domain resource allocation in the stored electronic documents;

wherein the AI bias-related scoring model is trained to receive as input data in the desired common representation and output an indication of bias in the group of electronic documents, wherein the indication of bias in the group of electronic documents is determined by:

expanding the information relating to the group of entities to additionally include a set of keywords associated with the bias, generating an association score between the set of keywords associated with the bias and two or more different topics, and comparing the association score to a threshold value; and in response to the determining the association score is above a threshold value, removing a portion of the group of electronic documents associated with the indication of bias in the group of electronic documents; and communicating to a user device for presentation at the user device, information indicating the first previously unknown relationship and the second previously unknown relationship.

15. The system of claim 14, wherein the operations further comprise:

based on the first previously unknown relationship between the first topic and the second topic:

assigning first resources associated with a first organization identity and second resources associated with a second organization identity; or communicating topic information relating to the first topic to the user device associated with a user identity, wherein the user identity is determined to be associated with the second topic.

16. The system of claim 14, wherein the operations further comprise:

performing an artificial intelligence analysis using the association model information.

17. The system of claim 14, wherein the operations further comprise:

receiving the group of electronic documents or the information regarding the group of entities from a group of data sources, wherein the information regarding the group of entities comprises a group of keywords relating to the group of topics, data dictionary information, metadata, domain knowledge information relating to a type of domain associated with the first topic, grouping information relating to grouping of entities, organization-related terminology, or unstructured textual information defining some respective topics of the group of topics, wherein the group of keywords comprise a first subgroup of keywords and a second subgroup of keywords, wherein the group of entities comprises a first subgroup of entities and a second subgroup of entities, wherein the first topic is associated with the first subgroup of entities and the first subgroup of keywords, and wherein the second topic is associated with the second subgroup of entities and the second subgroup of keywords.

18. The system of claim 14, wherein the operations further comprise:

determining respective relationship strength scores associated with respective pairs of the respective entities based on the scoring model using the graph mining techniques including Dijkstra's algorithm.

19. A non-transitory machine-readable medium, comprising executable instructions that, when executed by a processor, facilitate performance of operations, comprising:

maintaining, in a data storage, a data source storing electronic documents, and metadata and data dictionaries relating to the electronic documents, wherein the data source comprises structured information and unstructured information;

receiving information from the data source and an external data source;

receiving information relating to a particular domain, resulting in a domain knowledge constraint relating to the particular domain;

determining an association inference model, to extract information regarding a group of entities, respective relationships between the respective entities, and a group of topics based on analysis of the received information and construct a graph representation of the group of entities as nodes, and respective relationships between respective entities as edges associated with the group of topics;

determining a scoring model by embedding the respective entities, the respective relationships between entities and the group of topics to a desired common representation to map structured or unstructured information relating to the group of entities, the respective relationships, and the topics to the desired common representation, thereby generating an entity relationship topic mapping, wherein the scoring model is further configured to be trained to quantify a strength of the respective relationships between entities in the graph representation using graph mining techniques including Dijkstra's algorithm;

in the graph representation, determining, using the scoring model, a first previously unknown relationship between a first entity associated with a first topic and a second entity not associated with the first topic or a second topic, wherein the first previously unknown relationship is determined based on a first shortest path, using Dijkstra's algorithm, in the graph representation connecting the first entity and the second entity and satisfies a defined relationship strength threshold, and wherein the first topic and the second topic respectively correspond to different domains and are subject to different domain knowledge constraints;

in the graph representation, determining using the scoring model, a second previously unknown relationship between the second entity and a third entity associated with the second topic, wherein the second previously unknown relationship is determined based on a second shortest path, using Dijkstra's algorithm, in the graph representation connecting the second entity and the third entity and satisfies the defined relationship strength threshold;

outputting information indicating the first previously unknown relationship and the second previously unknown relationship for presentation via a user interface, wherein the output is generated in response to quantified strengths exceeding the defined relationship strength threshold; and utilizing information indicating the first previously unknown relationship and the second previously unknown relationship to identify problematic content, supplement lack of information, and determine cross-domain resource allocation in the stored electronic documents;

wherein the scoring model further comprises an artificial intelligence (AI) bias-related scoring model, wherein the AI bias-related scoring model is trained to receive as input data in the desired common representation and output an indication of bias in the group of electronic documents, wherein the indication of bias in the group of electronic documents is determined by:

expanding the information regarding the group of concepts to additionally include a set of keywords associated with bias, generating an association score between the set of keywords associated with bias and two or more different topics, comparing the association score to a threshold value; and in response to the determining the association score is above a threshold value, removing a portion of the group of electronic documents associated with the indication of bias in the group of electronic documents; and transmitting information indicating the first previously unknown relationship and the second previously unknown relationship for presentation via a user interface, wherein the output is generated in response to quantified strengths exceeding the defined relationship strength threshold; and communicating, to a user device for presentation at the user device, information indicating the first previously unknown relationship and the second previously unknown relationship.

20. The non-transitory machine-readable medium of claim 19, wherein the operations further comprise:

based on the first previously unknown relationship between the first topic and the second topic:

transmitting topic information relating to the first topic to the user device associated with a user identity, wherein the user identity is associated with the second topic.

* * * * *